(12) United States Patent
Toye

(10) Patent No.: US 10,939,624 B2
(45) Date of Patent: Mar. 9, 2021

(54) NETTING MATERIALS

(71) Applicant: Nine IP Limited, Auckland (NZ)

(72) Inventor: Jonathan Dallas Toye, Auckland (NZ)

(73) Assignee: NINE IP LIMITED, Auckland (NZ)

( * ) Notice: Subject to any disclaimer, the term of this patent is extended or adjusted under 35 U.S.C. 154(b) by 232 days.

(21) Appl. No.: 15/118,080

(22) PCT Filed: Feb. 11, 2015

(86) PCT No.: PCT/NZ2015/050012
§ 371 (c)(1),
(2) Date: Aug. 10, 2016

(87) PCT Pub. No.: WO2015/122783
PCT Pub. Date: Aug. 2, 2015

(65) Prior Publication Data
US 2016/0353677 A1 Dec. 8, 2016

(30) Foreign Application Priority Data

Feb. 11, 2014 (NZ) .......................................... 621124
Feb. 11, 2014 (NZ) .......................................... 621127

(51) Int. Cl.
*A01G 13/02* (2006.01)
*A01G 13/10* (2006.01)
*A01G 9/22* (2006.01)
*D04G 1/00* (2006.01)
*D04B 21/12* (2006.01)

(52) U.S. Cl.
CPC ................ *A01G 13/02* (2013.01); *A01G 9/22* (2013.01); *A01G 13/0206* (2013.01); *A01G 13/0225* (2013.01); *A01G 13/0237* (2013.01); *A01G 13/10* (2013.01); *A01G 13/105* (2013.01);
(Continued)

(58) Field of Classification Search
CPC ................ A01G 13/02; A01G 13/0206; A01G 13/0225; A01G 13/0237; A01G 13/10; A01G 9/22; D04B 21/10; D04B 21/12; Y02A 40/258
See application file for complete search history.

(56) References Cited

U.S. PATENT DOCUMENTS

| 2,601,326 | A | * | 6/1952 | Rohs | ..................... | A01G 9/1438 |
| | | | | | | 47/17 |
| 3,447,345 | A | * | 6/1969 | Kurz | ...................... | D04B 21/10 |
| | | | | | | 66/195 |
| 3,558,412 | A | * | 1/1971 | Kurz | ...................... | D02G 3/402 |
| | | | | | | 156/148 |

(Continued)

FOREIGN PATENT DOCUMENTS

| AU | A-34723/89 A | 11/1989 |
| EP | 2 465 984 A2 | 6/2012 |

(Continued)

*Primary Examiner* — Michael H Wang
(74) *Attorney, Agent, or Firm* — Seed IP Law Group LLP

(57) ABSTRACT

A netting material is knitted from at least two synthetic material yarns of which one is an opaque and the other is a transparent or translucent or different opaque yarn. A knitted netting material comprises a plurality of primary yarns knitted to form a mesh construction having an arrangement of primary apertures defined by yarn intersections and yarn connecting portions between yarn intersections, and a plurality of secondary yarns crossing over the primary apertures to form secondary apertures within the primary apertures.

21 Claims, 14 Drawing Sheets

(52) U.S. Cl.
CPC .............. *D04B 21/12* (2013.01); *D04G 1/00* (2013.01); *D10B 2403/0243* (2013.01); *Y02A 40/25* (2018.01)

(56) References Cited

U.S. PATENT DOCUMENTS

| | | | | |
|---|---|---|---|---|
| 3,741,631 | A * | 6/1973 | Laing | A01G 9/1415 359/228 |
| 4,572,960 | A * | 2/1986 | Ebneth | A41D 31/0072 250/516.1 |
| 4,632,863 | A * | 12/1986 | Henningsson | A01G 9/1438 442/186 |
| 4,750,292 | A * | 6/1988 | Alstig | A01G 13/10 383/37 |
| 6,586,350 | B2 * | 7/2003 | Guberman | A01G 13/02 428/318.4 |
| 7,188,494 | B2 * | 3/2007 | Dort | D04B 21/12 66/195 |
| 2003/0056552 | A1 * | 3/2003 | Englebert, Sr. | D04B 21/00 66/170 |
| 2003/0085005 | A1 * | 5/2003 | Sampietro | A01G 9/22 160/330 |
| 2003/0140554 | A1 * | 7/2003 | Whitcomb | A01G 13/0237 47/32.4 |
| 2004/0016176 | A1 * | 1/2004 | Hadar | A01G 13/10 47/31 |
| 2004/0232401 | A1 * | 11/2004 | Tsai | A01G 9/1438 256/45 |
| 2004/0251688 | A1 * | 12/2004 | Safwat | A01K 31/14 289/1.2 |
| 2006/0032133 | A1 * | 2/2006 | Tuoriniemi | A01G 13/0237 47/72 |
| 2008/0134726 | A1 * | 6/2008 | Lais | D04B 21/10 66/170 |
| 2010/0139327 | A1 * | 6/2010 | Karatzis | D04B 21/12 66/190 |
| 2012/0090229 | A1 * | 4/2012 | Toye | A01G 13/0206 47/31 |
| 2013/0219783 | A1 * | 8/2013 | Toye | A01G 13/0206 47/31 |
| 2014/0259901 | A1 * | 9/2014 | Williams | A01G 13/10 47/31 |
| 2016/0073592 | A1 * | 3/2016 | Toye | A01G 9/1438 47/31 |

FOREIGN PATENT DOCUMENTS

| | | |
|---|---|---|
| WO | WO 98/21935 | 5/1998 |
| WO | WO 2012/030237 A2 | 3/2012 |
| WO | WO 2014/178733 A1 | 11/2014 |

* cited by examiner

NETTING MATERIALS

FIELD OF INVENTION

The invention relates to netting materials and particularly but not exclusively to netting materials for use as a bird or insect, or wind barrier netting or in other agricultural applications.

BACKGROUND

Bird, insect, hail, wind, or shade netting may be placed near plants to protect for example annual plants, perennial plants, fruit trees, or grape vines, from birds, insects, excessive wind, or hail. Typically the netting is supported over the plant(s) and/or as a vertical and/or angled wall or walls near the plant(s), by for example cables or wires between posts positioned along the rows of plants in a garden, field crop, orchard or vineyard, or is draped over the plant(s).

Wind break netting may be arranged as walls supported from posts and wires (for example) to substantially reduce wind impact from certain directions.

SUMMARY OF INVENTION

An object of the present invention is to provide an improved netting material or one which will at least provide the industry with a useful choice.

Netting with an Opaque First Yarn and a Second Yarn that is Transparent, Translucent or a Different Opaque In one aspect, the invention comprises a netting material which is knitted from at least two synthetic material yarns of which one is an opaque (as defined herein) yarn (as herein defined) and the other is:

a transparent or translucent (as defined herein) yarn, or or different opaque yarn.

In another aspect, the invention comprises a netting material which is knitted, from:
an opaque yarn formed from a resin comprising at least one pigment, and
    a transparent or translucent yarn, or substantially translucent or
    or different opaque yarn.

In some embodiments the opaque yarn transmits, on average, 2% to 5% less, or 5% to 10% less, or 10% to 30% less, of solar radiation across the 400-700 nm wavelength range compared to the translucent or transparent, or different opaque yarn.

Opaque Yarn

Preferably the opaque yarn is pigmented, reflective or opaque.

Preferably the opaque yarn is white, red, orange, yellow, green, blue or a mixture of shades or colors.

The opaque yarn preferably comprises one of the following:

the opaque yarn absorbs at least 70% or at least 80% solar radiation on average across the UV (wavelength about 280-400 nm), and reflects at least 30%, 50% or 70% solar radiation across the visible (wavelength about 400-700 nm) and very near infrared (wavelength about 700-800 nm) ranges.

the opaque yarn reflects at least 30%, 50%, or 70% solar radiation on average across the UV (wavelength about 280-400 nm), and reflects at least 30%, 50% or 70% solar radiation across the visible (wavelength about 400-700 nm) and very near infrared (wavelength about 700-800 nm) ranges.

the opaque yarn absorbs at least 30%, 50% or 70% solar radiation at any point across the UV (wavelength about 280-400 nm), and reflects at least 30%, 50% or 70% solar radiation across the visible (wavelength about 400-700 nm) at any one point and very near infrared (wavelength about 700-800 nm) ranges.

the opaque yarn reflects at least 30% solar radiation on average across the UV (wavelength about 280-400 nm), visible (wavelength about 400-700 nm) and very near infrared (wavelength about 700-800 nm) ranges.

the opaque yarn transmits at least 4%, 10%, 20%, 30%, 40% or 50% on average of solar radiation across the wavelength range about 800-2500 nm.

the opaque yarn reflects at least 40% solar radiation on average across the UV (wavelength about 280-400 nm), visible (wavelength about 400-700 nm) and very near infrared (wavelength about 700-800 nm) ranges.

the opaque yarn absorbs at least 50% solar radiation on average across the UV (wavelength about 280-400 nm), and reflects at least 50% solar radiation across the visible (wavelength about 400-700 nm) and very near infrared (wavelength about 700-800 nm) ranges.

the opaque yarn absorbs at least 50% solar radiation on average across the UV (wavelength about 280-400 nm), and reflects less than 50% solar radiation across the visible (wavelength about 400-700 nm) and very near infrared (wavelength about 700-800 nm) ranges.

Preferably each opaque yarn extends along a path including a sequence of yarn intersections alternating with yarn connecting portions.

Preferably each opaque yarn is not knitted or knotted, but may be looped at the yarn intersections Transparent or Translucent Yarn in Opaque-Transparent or Translucent Yarn Where the netting comprises an opaque yarn and a transparent or translucent yarn, preferably the transparent or translucent yarn is substantially transparent.

In some embodiments of nettings comprising a transparent or translucent yarn the transparent or translucent yarn may have high UV absorbance and high visible light transmittance (being translucent or transparent). For example, in some embodiments the transparent or translucent yarn absorbs at least 50% solar radiation on average across the UV (wavelength about 280-400 nm), and transmits at least 30% or 40% or 50% or 60% or 70% or 80% or 90% or more of solar radiation on average across the visible (wavelength about 400-700 nm) and very near infrared (wavelength about 700-800 nm) ranges.

In some embodiments of nettings comprising a transparent or translucent yarn the transparent or translucent yarn may have high UV transmittance and low UV absorbance. For example, in some embodiments the transparent or translucent yarn transmits at least 60% solar radiation on average across the UV (wavelength about 280-400 nm), and absorbs less than 20% of solar radiation across that same range.

In some embodiments the transparent or translucent yarn may comprise a UV absorbing pigment or combination of pigments selected from barium titanate, magnesium titanate, tin oxide, zinc oxide, zinc oxide nano particle size, titanium dioxide, titanium oxide and zinc sulphide. In some embodiments the transparent or translucent yarn is formed from a resin comprising 0.5% to 1% of the UV absorbing pigment. In some embodiments the UV absorbing pigment may be present in the form of particles of size 0.02-5 microns or 0.1-3 microns.

The translucent yarn can also be UV reflecting (at least 10% reflectance). In this case it may have a low pigment level of calcium carbonate (0.5% to 1.5% CaCO3) pigment by weight.

The transparent or translucent yarn may be formed from a non-pigmented material.

Different Opaque Yarn in Opaque-Different Opaque Yarn Netting

Where the opaque yarn is white and the yarn also comprises a different opaque yarn instead of a transparent or translucent yarn, preferably the different opaque yarn is also white but is a different white.

Where the netting comprises an opaque yarn and a different opaque yarn then each of the opaque yarn and the a different opaque yarn comprises a different one of the following:

the opaque yarn absorbs at least 70% or at least 80% solar radiation on average across the UV (wavelength about 280-400 nm), and reflects at least 30%, or 50% or 70% solar radiation across the visible (wavelength about 400-700 nm) and very near infrared (wavelength about 700-800 nm) ranges.

the opaque yarn reflects at least 30% solar radiation on average across the UV (wavelength about 280-400 nm), visible (wavelength about 400-700 nm) and very near infrared (wavelength about 700-800 nm) ranges.

the opaque yarn transmits at least 10% on average of solar radiation across the wavelength range about 800-2500 nm.

the opaque yarn reflects at least 40% solar radiation on average across the UV (wavelength about 280-400 nm), visible (wavelength about 400-700 nm) and very near infrared (wavelength about 700-800 nm) ranges.

the opaque yarn absorbs at least 50% solar radiation on average across the UV (wavelength about 280-400 nm), and reflects at least 50% solar radiation across the visible (wavelength about 400-700 nm) and very near infrared (wavelength about 700-800 nm) ranges.

Other

In some embodiments the opaque yarn and/or different opaque yarn (if present) absorbs more solar radiation than it reflects or transmits in the UV range, and reflects more solar radiation than it transmits and absorbs in the visible, and very near infrared ranges.

In some embodiments the opaque yarn and/or different opaque yarn (if present) reflects more solar radiation than it transmits and absorbs in the UV, visible, and very near infrared ranges.

In some embodiments the opaque yarn and/or different opaque yarn (if present) transmits at least 15% or at least 20% of solar radiation on average in the wavelength range about 800-2500 nm.

In some embodiments the opaque yarn and/or different opaque yarn may be any of the following: black, white, white (UV or non-UV reflecting white) in colour, white UV absorbing, coloured, formed from a non-pigmented material, formed from plastic, or formed from a range of polymers.

In some embodiments the opaque yarn and/or different opaque yarn (if present) is formed from a resin comprising more than 1% by weight of a white pigment.

In some embodiment the opaque yarn and/or different opaque yarn (if present) is formed from a resin comprising more than 2% by weight of a white pigment.

In some embodiments the opaque yarn and or different opaque yarn (if present) is formed from a resin comprising more than 10% by weight of a white pigment.

In some embodiments the opaque yarn and or different opaque yarn (if present) is formed from a resin comprising more than 3% by weight of a white pigment.

In some embodiments the opaque yarn and or different opaque yarn (if present) is formed from a resin comprising a primary white pigment and a secondary white pigment, the total white pigment comprising more than 10% by weight.

In some embodiments the opaque yarn and or different opaque yarn (if present) is formed from a resin comprising a white pigment and a secondary black or dark pigment, the total pigment comprising more than 1% or 2% or 3% or 5% or 10% by weight.

In some embodiments the opaque yarn and or different opaque yarn (if present) is formed from a resin comprising a black pigment.

In certain embodiments the opaque yarn and/or different opaque yarn (if present) comprises a resin and at least 1%, at least 2%, at least 3%, at least 10%, at least 12% or at least 14%, or at least 16%, or at least 18% or 20% or 25% or 30% by weight of a white pigment.

In certain embodiments the white pigment may be present in the form of particles of size 0.02-5 microns or 0.1-3 microns.

Preferably the opaque yarn and/or different opaque yarn (if present) is formed from a resin incorporating at least one white pigment, which resin has been formed by mixing a masterbatch consisting essentially of 10 or 20% to 90% by weight of white pigment and a polymer, with a transparent or translucent polymer such that the masterbatch comprises between about 4 or 5 to 50% by weight of the total mixture transparent or translucent.

In certain embodiments the white pigment or combination of pigments may be selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, and potassium oxide, zinc oxide, zinc oxide nano particle size, barium titanate, magnesium titanate, strontium titanate, neodymium titanate, tin oxide, cerium oxide, titanium oxide, zinc sulphate.

In certain embodiments the UV absorbing organic or inorganic pigment or combination of pigments may be selected from barium titanate, magnesium titanate, tin oxide, zinc oxide, zinc oxide nano particle size, benzotriazole, titanium dioxide, titanium oxide and zinc sulphide.

In another aspect, the invention comprises a method of treating a plant or fruit or vegetables thereon which comprises providing over and/or adjacent the plant as bird netting, insect netting, shadecloth netting, windbreak netting, or hail protection netting a netting material as set forth above.

Netting Structure

The opaque and the different opaque or transparent or translucent synthetic yarns may be monofilament, yarn, or tape or combination thereof, and may be of different physical strengths. For example the transparent or translucent yarn or different opaque yarn may be physically stronger than the opaque yarn.

Knitted Transparent or Translucent or Different Opaque Netting, with Opaque Lay in:

In some embodiments the invention comprises a netting material comprising yarns knitted to form a mesh construction with an arrangement of apertures defined by yarn intersections and connecting yarn portions between the yarn intersections; each of a majority of the connecting yarn portions comprises two or more yarns including an opaque yarn (lay in) which is not knitted, knotted or looped in the connecting yarn portion, and a transparent or translucent yarn or different opaque yarn which is knotted or looped in the connecting yarn portion, including being knitted, knotted or looped around the opaque yarn.

In some embodiments, 'looped' may mean that the yarn direction changes more than 180 degrees from one direction to another direction in a linear plane. While a lay in looped yarn is less than 180 degrees change on direction.

Preferably for a majority of the apertures of the mesh, each connecting yarn portion defining the aperture comprises two or more yarns including a opaque yarn which is not knitted, knotted or looped in the connecting yarn portion, and a transparent or translucent yarn or different opaque yarn which is knotted or looped in the connecting yarn portion, including being knitted, knotted or looped around the opaque yarn.

Netting Knitted from Opaque and Transparent or Translucent or Different Opaque Yarn:

In other embodiments the invention comprises a netting material comprising yarns knitted to form a mesh construction with an arrangement of apertures defined by yarn intersections and connecting yarn portions between the yarn intersections; each of a majority of the connecting yarn portions comprises two or more yarns including the opaque yarn and the transparent or translucent yarn or different opaque yarn.

Preferably the netting is knitted from multiple yarns all extending along a length of the netting. In a preferred form each yarn follows an approximate zig-zag path along the length of the netting, with alternating yarn intersections and connecting yarn portions.

Preferably, each yarn intersection in the netting is connected to adjacent and surrounding yarn intersections by connecting yarn portions each comprising at least two yarn lengths, at least one yarn length being of a pigmented/opaque yarn.

Preferably the yarn length that is opaque/pigmented is free of knots and loops in the length between intersections or at least free of knots or loops for 2 mm or more in length between the intersections.

Preferably each connecting yarn portion includes at least one transparent or translucent yarn, and this yarn is knotted/looped in the length between intersections.

Preferably each transparent or translucent yarn or different opaque yarn extends along a path including a sequence of yarn intersections alternating with yarn connecting portions, including being knitted, knotted or looped around the opaque yarn.

Preferably the netting comprises rows of the yarn intersections adjacent to one another in a opaque axis or direction across the netting, typically across a machine or manufacturing axis or direction of the netting. Preferably in immediately adjacent rows of yarn intersections in a transparent or translucent or different opaque direction substantially orthogonal to said opaque direction, typically a machine or manufacturing axis or direction of the netting, the yarn intersections of the adjacent rows are staggered relative to one another.

Preferably the width of the netting is substantially uniform along the length of the netting.

Preferably the mesh size is in the range of approximately 3 mm to 30 mm 3 mm to 20 mm, 3 mm to 10 mm.

In one form the netting is formed from elastic yarn. In another form, the netting is formed from non-elastic yarn. In another form the netting is formed from yarn that has some elongation when stretched but is neither elastic nor non-elastic.

In one form the netting is formed by twin, triple, or multiple or single monofilament fibre yarns. In one form the yarn is monofilament. Preferably, the monofilament has a substantially circular cross-section. More preferably the yarn has diameter in the range of approximately 0.1 mm to 1 mm, even more preferably 0.2 mm to 0.8 mm, and even more preferably 0.2 mm to 0.4 mm, and more preferably 0.2 to 0.3 mm and most preferably 0.15 mm to 0.25 mm. The yarn is preferably in the range of approximately 50 to 1000 denier, or 100 to 800 denier, or 200 or 300 to 700 denier, or 400 to 500 denier, or is 500 to 550 denier.

Typically the netting is machine-knitted for example on a warp knitting machine or a weft insertion warp knitting machine.

Preferably the weight of the netting is in the range of approximately 10 to 150 grams per $m^2$, or 40 to 120 grams per $m^2$, or 60 to 100 grams per $m^2$, or 10 to 100 grams per $m^2$, or 15 to 80 grams per $m^2$, or 20 to 60 grams per $m^2$, or 20 to 40 grams per $m^2$, or 30 to 40 grams per $m^2$ or 25 to 35 grams per $m^2$.

In some embodiments the yarn may incorporate a compound or compounds added to cause or increase the extent to which the netting allows transmission of radiation from the earth (terrestrial (long wave or infrared) radiation). Thus when the netting is placed over or adjacent to plants it will assist in releasing the heat beneath the netting which may be desirable for some plants or applications.

In other embodiments the yarn may incorporate a compound or compounds added to cause or increase the extent to which the netting reflects and/or absorbs solar radiation. Thus when the netting is placed over plants it will assist in cooling beneath the material, which may be desirable for some plants or applications.

In other embodiments the yarn may incorporate a compound or compounds added to cause or increase the extent to which the netting allows transmission and/or absorption of solar radiation. Thus when the material is placed over plants it will assist in increasing the heat beneath the material, which may be desirable for some plants or applications.

In a further aspect the invention consists in a method of protecting plants comprising the step of at least partially covering a plant or row of plants with a crop protection netting of a form as set forth above.

In one form the step of covering the plant(s) comprises securing the netting over the entirety of the plant(s) and securing or fixing it to the ground surface surrounding the plants.

In another form the step of covering the plant(s) comprises suspending or supporting the netting over the top of the plant(s) as a canopy using a supporting structure or framework.

Netting with Secondary Yarns Forming Secondary Apertures

In another aspect the invention comprises a netting material comprising:
  a plurality of primary yarns knitted to form a mesh construction having an arrangement of primary apertures defined by yarn intersections and yarn connecting portions between yarn intersections, and
  a plurality of secondary yarns, the secondary yarns crossing over the primary apertures to form secondary apertures within the primary apertures.

In at least some embodiments the secondary yarns are retained in the netting material by the knitting or knotting or looping of the primary yarns without being knitted, knotted or looped in the yarn connecting portions.

In at least some embodiments each of a majority of the yarn connecting portions comprises:
- a secondary yarn which is not knotted or looped in the yarn connecting portion,
- a primary yarn being knitted, knotted or looped around the secondary yarn in the yarn connecting portion,
- wherein each secondary yarn passes part way along a yarn connecting portion and extends from the yarn connecting portion to cross over a primary aperture to another yarn connecting portion defining the primary aperture so that at least two secondary yarns cross over each primary aperture to define at least four secondary apertures in each primary aperture.

In at least some embodiments the plurality of primary yarns each extend along a length of the netting in an approximate zig-zag path with alternating yarn intersections and connecting yarn portions, adjacent primary yarns knitted, knotted or looped together at the yarn intersections.

In at least some embodiments wherein the plurality of secondary yarns each extend along a length of the netting material in an approximate zig-zag path.

In at least some embodiments each secondary yarn extends along the length of the netting material in an approximate zig-zag path at a zig-zag pitch and amplitude the same as a zig-zag pitch and amplitude of the primary yarns, the zig-zag path of each secondary yarn offset along a connecting yarn portion of the mesh construction by a distance so that each secondary yarn crosses over a primary aperture and through yarn intersections along the length of the netting material.

In at least some embodiments a repeating portion of the zig-zag path each secondary yarn extends from a yarn intersection at a first end of a yarn connecting portion, partway along a yarn connecting portion, across a primary aperture, and partway along the yarn connecting portion on the opposite side of the primary aperture to a yarn intersection at a second end of the yarn connecting portion of the opposite side of the primary aperture.

In at least some embodiments each of a majority of the connecting yarn portions comprises:
- two or more secondary yarns, each secondary yarn not knotted or looped in the connecting yarn portion,
- a primary yarn being knitted, knotted or looped around the two or more secondary yarns in the connecting yarn portion,
- wherein the secondary yarns pass part way along the connecting yarn portion and extend from the connecting yarn portion to cross over a primary aperture in a spaced apart relation to another connecting yarn portion defining the primary aperture so that at least two pairs of secondary yarns cross over each primary aperture to define at least nine secondary apertures in each primary aperture.

In at least some embodiments each of a majority of the connecting yarn portions comprises:
- one pair of secondary yarns, each secondary yarn not knotted or looped in the connecting yarn portion,
- a primary yarn being knitted, knotted or looped around the pair of secondary yarns in the connecting yarn portion,
- wherein the secondary yarns pass part way along the connecting yarn portion and extend from the connecting yarn portion to cross over a primary aperture in a spaced apart relation to another connecting yarn portion defining the primary aperture so that two pairs of secondary yarns cross over each primary aperture to define nine secondary apertures in each primary aperture.

The secondary yarns may pass part way along the connecting yarn portion and extend from the connecting yarn portion to cross over a primary aperture in a spaced apart relation to a connecting yarn portion on an opposite side of the primary aperture.

The secondary apertures and the primary apertures may have the same or similar aspect ratio.

The netting material may comprise rows of the yarn intersections adjacent to one another in a first axis or direction across the netting, and in immediately adjacent rows of yarn intersections in a second direction substantially orthogonal to said first direction, the yarn intersections of the adjacent rows are staggered relative to one another.

In at least some embodiments the primary apertures have four sides, each primary aperture defined by four yarn connecting portions.

In at least some embodiments the primary yarn is an opaque yarn formed from a resin comprising at least one pigment, such as a white pigment.

In at least some embodiments the secondary yarn is translucent or substantially transparent.

Primary Yarn

In some embodiments the primary yarn absorbs at least 70% or at least 80% solar radiation on average across the UV (wavelength about 280-400 nm), and reflects at least 50% solar radiation across the visible (wavelength about 400-700 nm) and very near infrared (wavelength about 700-800 nm) ranges.

In some embodiments the primary yarn reflects at least 30% solar radiation on average across the UV (wavelength about 280-400 nm), visible (wavelength about 400-700 nm) and very near infrared (wavelength about 700-800 nm) ranges.

In some embodiments the primary yarn transmits at least 10% on average of solar radiation across the wavelength range about 800-2500 nm.

In some embodiments the primary yarn reflects at least 30%, 40% solar radiation on average across the UV (wavelength about 280-400 nm), visible (wavelength about 400-700 nm) and very near infrared (wavelength about 700-800 nm) ranges.

In some embodiments the primary yarn absorbs at least 30% or 50% or 70% solar radiation on average across the UV (wavelength about 280-400 nm), and reflects at least 30% or 50% or 70% solar radiation across the visible (wavelength about 400-700 nm) and very near infrared (wavelength about 700-800 nm) ranges.

In some embodiments the primary yarn absorbs more solar radiation than it reflects or transmits in the UV range, and reflects more solar radiation than it transmits and absorbs in the visible, and very near infrared ranges.

In some embodiments the primary yarn reflects more solar radiation than it transmits and absorbs in the UV, visible, and very near infrared ranges.

In some embodiments the primary yarn transmits at least 15% or at least 20% of solar radiation on average in the wavelength range about 800-2500 nm.

In some embodiments the primary yarn is formed from a resin comprising more than 1% by weight of a white pigment.

In some embodiments the primary yarn is formed from a resin comprising more than 2% by weight of a white pigment.

In some embodiments the primary yarn is formed from a resin comprising more than 10% by weight of a white pigment.

In some embodiments the primary yarn is formed from a resin comprising more than 3% by weight of a white pigment.

In some embodiments the primary yarn is formed from a resin comprising a primary white pigment and a secondary white pigment, the total white pigment comprising more than 10% by weight.

In some embodiments the primary yarn is formed from a resin comprising a black or dark pigment.

In some embodiments the primary yarn comprises a resin and at least 1% or at least 2% or at least 3% or at least 5% or at least 10%, at least 12% or at least 14%, or at least 16%, or at least 18% or at least 20% or at least 25% or at least 30% by weight of a white pigment.

In some embodiments the white pigment may be present in the form of particles of size 0.02-5 microns or 0.1-3 microns.

In some embodiments the primary yarn is formed from a resin incorporating at least one white pigment, which resin has been formed by mixing a masterbatch consisting essentially of 10 to 90% by weight of white pigment and a first polymer, with a second polymer such that the masterbatch comprises between about to 50% by weight of the total mixture.

In some embodiments the primary yarn is formed from a resin incorporating at least one white pigment, which resin has been formed by mixing a masterbatch consisting essentially of 20 to 90% by weight of white pigment and a first polymer, with a second polymer such that the masterbatch comprises between about 5 to 50% by weight of the total mixture.

In some embodiments the white pigment or combination of pigments may be selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, potassium oxide, zinc oxide, zinc oxide nano particle size, barium titanate, magnesium titanate, strontium titanate, neodymium titanate, tin oxide, cerium oxide, titanium oxide, zinc sulphate.

In certain embodiments the white pigment comprises two white pigment compounds, such as titanium dioxide and calcium carbonate.

In some embodiments the primary yarn may be any of the following: black, white (UV or non-UV reflecting white, or UV absorbing) in colour, coloured, formed from a non-pigmented material, formed from plastic, or formed from a range of polymers.

Secondary Yarn

In some embodiments the secondary yarn is formed from a resin comprising less than 1% by weight of a pigment.

In some embodiments the secondary yarn may have high transmittance (being translucent or transparent), and transmit at least 30 or 40% and more preferably at least 50% or 60% or 70% or 80% or 90% or more of at least UV and visible light.

In some embodiments the secondary yarn may have high UV absorbance and high visible light transmittance (being translucent or transparent). For example, in some embodiments the secondary yarn absorbs at least 50% solar radiation on average across the UV (wavelength about 280-400 nm), and transmits at least 30% or 40% or 50% or 60% or 70% or 80% or 90% or more of solar radiation on average across the visible (wavelength about 400-700 nm) and very near infrared (wavelength about 700-800 nm) ranges.

In some embodiments the secondary yarn may comprise a UV absorbing organic or inorganic pigment or combination of pigments selected from barium titanate, magnesium titanate, tin oxide, zinc oxide, zinc oxide nano particle size, benzotriazole, titanium dioxide, titanium oxide and zinc sulphide. In some embodiments the secondary yarn is formed from a resin comprising 0.5% to 1% of the UV absorbing pigment. In some embodiments the UV absorbing pigment may be present in the form of particles of size 0.02-5 microns or 0.1-3 microns.

The secondary yarn can also be UV reflecting (at least 10% reflectance).

In some embodiments the width of the netting is substantially uniform along the length of the netting.

In some embodiments the mesh size is in the range of approximately 3 mm to 30 mm, 3 mm to 20 mm, or 3 mm to 10 mm.

Other

In some embodiments the primary and secondary yarns are double, triple, or multifilament yarns or are monofilament yarns. In one form the primary and secondary yarns are monofilament yarns. Preferably, the monofilament has a substantially circular cross-section. More preferably the monofilament has diameter in the range of approximately 0.1 mm to 1 mm, even more preferably 0.2 mm to 0.8 mm, and even more preferably 0.2 mm to 0.4 mm, and more preferably 0.2 to 0.3 mm and most preferably 0.15 mm to 0.25 mm In denier, the monofilament yarn is preferably in the range of approximately 50 to 1000 denier, more preferably 50 to 700 denier, even more preferably 100 to 500 denier, even more preferably 100 to 300 denier, even more preferably 150 to 250 denier or even more preferably 200 to 300 denier. In some embodiments the primary yarn is 500 denier and the secondary yarn is 250 denier. In some embodiments the primary yarn is 250 denier and the secondary yarn is 500 denier.

In some embodiments the primary and/or secondary yarns may be tapes. The tapes may be 1 mm to 5 mm, or 2 mm to 3 mm, wide. They may have a mass of 500 to 2500 denier, or 800 to 1200 denier. They may have a thickness of 0.04 to 0.08 mm.

Typically the netting is machine-knitted for example on a warp knitting machine or a weft insertion warp knitting machine.

In some embodiments the weight of the netting is in the range of approximately 20 to 200 grams per $m^2$, or 25 to 150 grams per $m^2$, or 30 to 100 grams per $m^2$, or 40 to 80 grams per $m^2$.

In some embodiments the primary yarn may incorporate a compound or compounds added to cause or increase the extent to which the netting allows transmission of radiation from the earth (terrestrial (long wave or infrared) radiation). Thus when the netting is placed over or adjacent to plants it will assist in releasing the heat beneath the netting, which may be desirable for some plants or applications.

In other embodiments the primary yarn may incorporate a compound or compounds added to cause or increase the extent to which the netting reflects and/or absorbs solar radiation. Thus when the netting is placed over plants it will assist in cooling beneath the material, which may be desirable for some plants or applications.

In other embodiments the primary yarn may incorporate a compound or compounds added to cause or increase the extent to which the netting allows transmission and/or absorption of solar radiation. Thus when the material is placed over plants it will assist in increasing the heat beneath the material, which may be desirable for some plants or applications.

In a further aspect the invention consists in a method of protecting plants comprising the step of at least partially covering a plant or row of plants with a crop protection netting of a form as set forth above.

In one form the step of covering the plant(s) comprises securing the netting over the entirety of the plant(s) and securing or fixing it to the ground surface surrounding the plants.

In another form the step of covering the plant(s) comprises suspending or supporting the netting over the top of the plant(s) as a canopy using a supporting structure or framework.

The term "yarn" as used in this specification and claims, unless the context suggests otherwise means multi or mono filament yarn, threads or fibres. The term "yarn" unless the context suggests otherwise, is intended to include longitudinally extending single filament elements having four sides when viewed in cross-section, such as a rectangular or square cross-section, also longitudinally extending elements having a multisided cross-section such as a triangular or hexagonal cross-section for example, and also longitudinally extending elements having a circular or oval or similar cross-section (sometimes referred to hereafter as monofilament). The yarns may be formed from any suitable polyolefin such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene-butadiene (SB), acrylonitrile-butadiene-styrene (ABS), styrene-acrylonitrile (SAN), polyethylene terephthalate (PET), polymethylmethacrylate (PMMA) and polycarbonate are useful as dye carriers and also for influencing radiation (reflecting, absorbing and transmission) properties and also other properties on the materials. Starch and other plant polymers are useful to increase biodegradability. Alternatively, to the extent compatible with the required transparency/opacity the yarns may comprise in part or whole of paper, wood or cellulose fibre, starch based polymers, casein, latex or in any combination of the above and/or with petroleum derived plastic polymers to the extent compatible according to the required transparency/opacity. The polymer or polymer blend may incorporate agents such as one or more pigments, UV stabilisers, antioxidants or processing aids.

A 'lay-in' yarn or tape, unless the context suggests otherwise, is a yarn or tape that is knitted or woven through at least some of the yarn or tape intersections and/or connecting portions defining the primary apertures that make up the mesh construction of a knitted netting material, said yarn or tape intersections and/or connecting portions forming the basic knit structure of such material, and is additional to, rather than a basic structural element of said basic knit structure. Typically the lay-in yarn is not looped back on itself more than 180 degrees in the primary direction of travel or knitting direction. If the lay-in yarn is removed the net's inherent structure will stay intact. It is supported by the basic yarn knitted structure.

The phrase "mesh size" as used in this specification and claims, unless the context suggests otherwise, is defined for the four-sided and equal-length sides form of mesh apertures as the length of the sides of the mesh aperture, or a substantially equivalent cross-sectional area for non-equilength sided mesh apertures or other more complex mesh aperture shapes formed by more than four sides, the cross-sectional area being determined when the netting is taut but not stretched in both directions.

The term "reflective" as used in this specification and claims is intended to mean that the netting filament or yarn themselves, excluding the air spaces, is reflective of at least 20%, or 30%, or 40%, or 50% or alternatively at least 55% or alternatively at least 60% of visible light on at least one side of the netting. In one embodiment of a reflective netting, the yarn may reflect at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm. The netting may reflect more solar radiation than it transmits and absorbs in the UV, visible, and very near infrared ranges. The material may transmit at least 15% or at least 20% of solar radiation on average in the wavelength range about 800-2500 nm. Some or all of a reflective yarn may be formed from a resin comprising a white pigment, which resin has been formed by mixing a masterbatch consisting essentially of 10 to 90% by weight of a white pigment or combination of pigments. chosen from zirconium, strontium, barium, magnesium, zinc, titanium, tin and calcium pigments, and a first polymer (optionally opaque), with a second polymer (optionally transparent or translucent) such that the resin (masterbatch) comprising the white pigment comprises between about 5 to 50% by weight of the total mixture. In some embodiments the white pigment may be selected from zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, potassium titanate, titanium dioxide, potassium oxide, zinc oxide, zinc oxide nano particle size, barium titanate, magnesium titanate, strontium titanate, neodymium titanate, tin oxide, cerium oxide, titanium oxide, and zinc sulphate.

The term "netting" or "netting material" as used in this specification and claims means, in the case of knitted material, material having a cover factor (as herein defined) of up to 98% but typically less than 95%, 90%, 80%, 70%, 60%, 50%, 40%, 30%, 20%, 10% or 5%.

The term "cover factor" as used in this specification and claims means the percentage of the overall area of the netting material which comprises knitted, woven, or nonwoven monofilament, yarn, or tape or a combination, forming the netting itself, judged from perpendicular to the plane of the netting when laid out flat, as opposed to air space in between the netting. Thus if a netting has a cover factor of 20% then the air space through the netting would be 80% of the total area of the netting.

The term "opaque" as used in this specification and claims means transmits little or no solar radiation in the visible (400 to 700 nm) range and/or UV (280 to 400 nm) range, unless the context otherwise requires.

The term "transparent" as used in this specification and claims means transmits most or all solar radiation in the visible (400 to 700 nm) range and/or UV range (280 to 400 nm), unless the context otherwise requires.

The term "translucent" as used in this specification is used to refer to materials that have a transmittance of solar radiation that is more than opaque and less than transparent.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

The invention is further described by way of example with reference to the accompanying drawings in which.

DETAILED DESCRIPTION OF EMBODIMENTS

Netting with an Opaque First Yarn and a Second Yarn that is Transparent, Translucent or Different Opaque A netting material suitable for providing over and/or adjacent the plant as bird netting, is knitted, woven, or non-woven, from synthetic monofilament, yarn, or tape or combination thereof, wherein at least some of the synthetic monofilament, yarn, or tape are formed from a resin comprising at least one opaque pigment (first opaque pigment), and some are formed from a resin which is transparent or translucent or which is a different opaque pigment (second opaque pigment), in which case preferably the first pigment and second opaque pigments are both white pigments but different white pigments (and 'pigment' includes both a single pigment substance or a mixture of multiple pigment substances).

In some embodiments netting of the invention may comprise apertures through the material of widest dimension about 30 mm. In other embodiments netting of the invention may comprise apertures through the material of widest dimension about 20 mm. In some embodiments netting of the invention may comprise apertures through the material of widest dimension in the range 10-30 mm.

Another part of the yarn from which the netting is formed may have high transmittance (being translucent or transparent), and transmit at least 30 or 40% more preferably at least 50% or 60% or 70% or 80% or 90% or more of at least UV and visible light.

Figure 1:
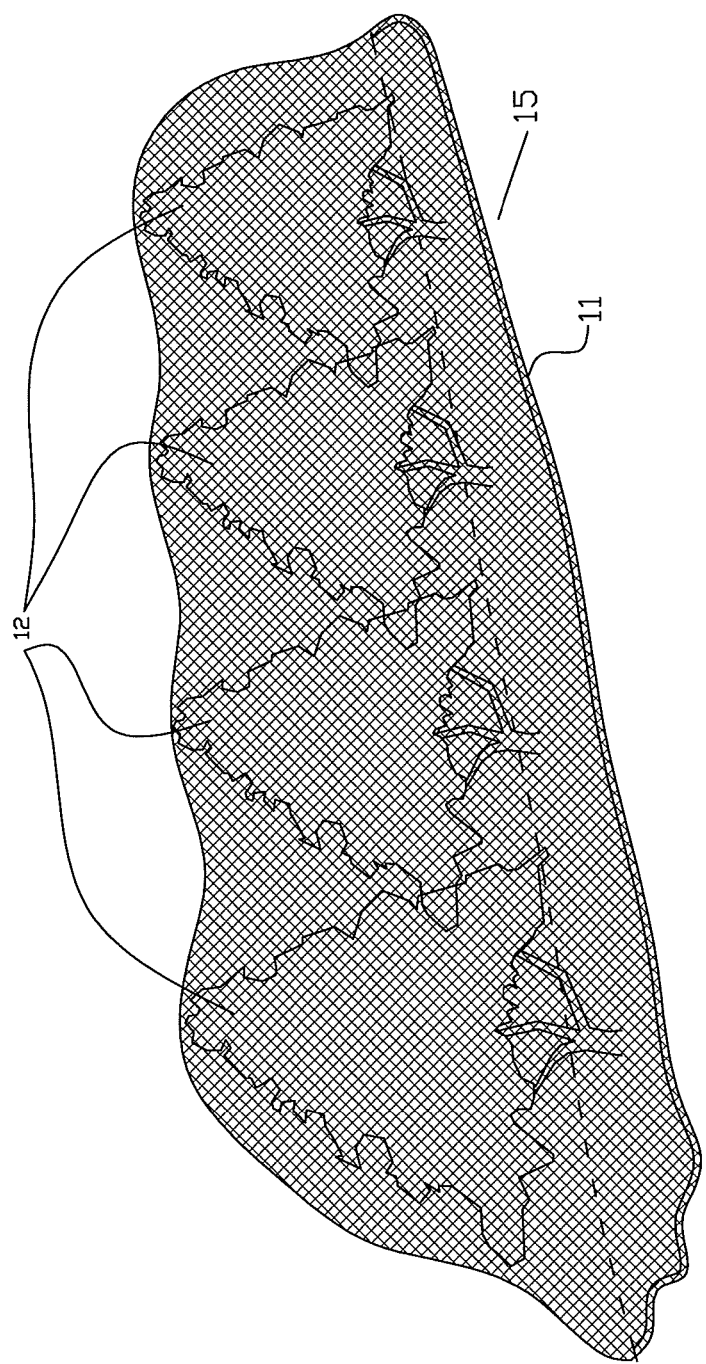
FIG. 1 is a schematic diagram of crop protection netting fully covering a row of plants.
Figure 2:
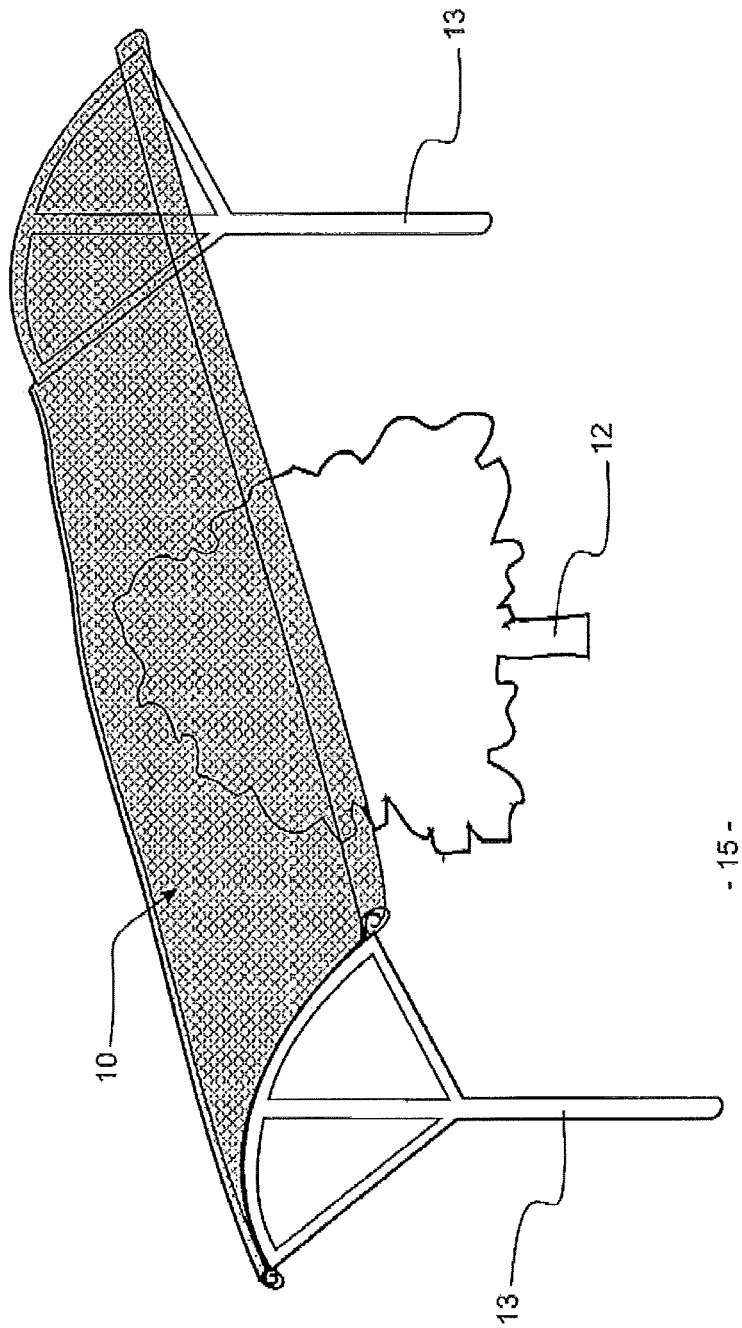
FIG. 2 is a schematic diagram of crop protection netting partially covering a row of plants.

Typically and as illustrated in FIGS. 1 and 2, the netting is supported over the plant(s) and/or as a vertical and/or angled wall or walls near the plant(s), by for example cables or wires between posts positioned along the rows of plants in a garden, field crop, orchard or vineyard, or is draped over the plant(s), as bird netting, insect netting (for repelling for example mosquitoes, or as for example bee exclusion netting), or wind or shade or hail netting, or is retained over the plant(s) by a supporting structure such as by wires above the plant(s) extending between support poles. Netting may be placed near plants to protect for example annual plants, perennial plants, fruit trees, or grape vines, vegetable plants, from birds or insects. Some elements of the netting are reflective or highly reflective due to relatively high content of the white pigment(s) in some of the included yarn. Thus UV and visible light incident on that yarn is reflected. A small portion of incident light hits the reflective yarns of the netting such that it is reflected away, but most light passes directly through the netting air space or through the translucent or transparent yarn of the netting to the plants and fruit. Some of the light undergoes a change in direction due to reflection from the netting but nonetheless enters the netting canopy but is diffused, and hits the plants and particularly fruit or vegetables below or adjacent the netting canopy and creates an environment that is favourable for plant growth and/or fruit or vegetable development, and an environment suited to beneficial organisms (insects, bacteria and fungi etc) and less favoured by non beneficial organisms of the plant or fruits or vegetables. An advantage of the reflectance of the reflective yarn portion may still be visible to insects and birds and thus more effective at repelling insects and birds because it forms a visible (or behavioural) as well as mechanical barrier. In another embodiment the UV component of the light incident on the netting may be absorbed.

Referring to FIG. 1, a length of crop protection netting 10 of the invention is shown placed over a row of fruit trees 12. Or alternatively the netting sits on top of the tree tops and is joined between the rows of the trees, to give a continuous net over the trees and not having to go down the sides of the trees, at least not the trees not on the edge of the block. The netting may be manufactured in a length and width to suit typical applications or a range of lengths and/or widths. Typically the width of the netting is between about 2 and 30 metres and the length of the netting is longer. For insect and bird exclusion typically the netting must be large enough to extend over an entire plant or row of plants as shown, and be secured, fastened or anchored at or toward the peripheral edges 11 of the netting with stakes, pegs, soil or other fixing devices to the ground 15 surrounding the periphery of the plant or plants such that bees or other insects and birds cannot fly under the netting into the trees. Alternatively, the edges 11 of the netting may drape onto the ground and need not necessarily be secured in any way other than under its own weight. As shown in FIG. 1, the netting 10 is draped over the trees such that it is in contact with and supported in place by the trees it covers. The netting may also be arranged such that its peripheral edges 11 extend at least some way toward the ground 15, or fully to the ground, if more or full coverage is desired.

FIG. 2 shows an alternative installation of crop protection netting of the invention as a canopy extending over the top of a fruit tree 12, and this installation may be applied over/along a row of trees also. The canopy installation comprises a supporting structure 13 or framework that supports or suspends the netting 10 over the fruit trees. The canopy could be placed on an angle (to shed hail) over the trees, or be arranged in a substantially flat horizontal plane. The supporting structure 13 may comprise one or more upright posts alone or in combination with supporting wire or wires or other cross-members extending between the posts. Typically this type of installation is for protecting crops against hail, bird or wind damage.

Optionally edge portions (not shown) of the netting may be reinforced or formed with different material to assist in fixing the netting to the ground. As shown, the entire netting or majority of the netting if the edges are reinforced is formed from a knitted mesh construction shown.

Figure 3:
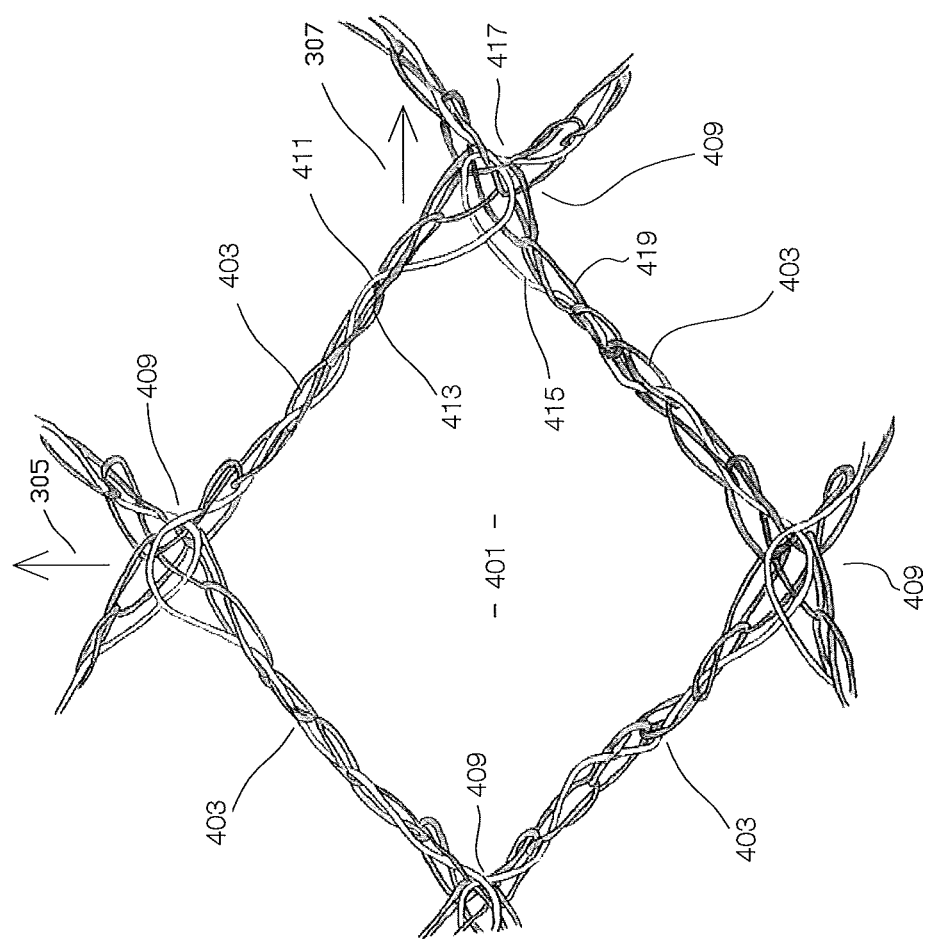
FIG. 3 is a plan view of a portion of netting in a taut but unstretched state in accordance with an embodiment of the invention.

The netting is typically machine-knitted on a warp knitting machine or other knitting-machine. The netting comprises an array of mesh apertures. The mesh apertures of the preferred embodiment are shaped as seen in FIG. 3, a combination of rounded base and pointed peak, forming four sides with four yarn intersections points and are substantially uniform in shape and size. The orientation of the mesh apertures relative to the length direction 307 and width direction 305 of the netting embodying need not be as shown in FIG. 3.

One form of netting embodying one or more of the inventions is illustrated in FIG. 3. FIG. 3 illustrates a small section of netting, the structure of which would typically be replicated throughout the major expanse of the netting. The netting may be finished with a different structure at each lateral edge, for example to include a finished edge, reinforced openings or other features.

FIG. 3 shows a single mesh aperture 401. The mesh aperture is defined by yarn connecting portions 403. In the illustrated form four yarn connecting portions are arranged to form sides of a four sided aperture, which is aligned at generally 45 degrees to the length direction 307 and width direction 305 of the netting. In some embodiments the aperture may be a square (or diamond when not fully expanded). The connecting portions 403 meet at intersections 409. Each yarn in the netting generally proceeds in the length direction 307. The yarns extend along an alternating sequence of connecting portions and intersections.

The mesh apertures may have a size, as measured around the perimeter of the aperture, of 20 to 160 mm, or 20 to 100, or 30 to 95 mm, or 40 to 90 mm, or 50 to 85 mm.

In the illustrated mesh, four yarns meet at each intersection, and each connecting portion consists of two yarns. So, for example, two yarns enter the intersection from each of two connecting portions, and two yarns exit the intersection as each of two connecting portions.

In the illustrated embodiment, one of the two yarns in each connecting portion follows a path that is not knitted, knotted or looped, and the other yarn follows a path that is knitted, knotted or looped. For example, yarn 411 weaves back and forth through knitted yarn 413. Yarn 411 is not knitted, knotted or looped, but is retained by the knitting and looping of yarn 413, which passes around yarn 411.

In some embodiments it is this yarn that is not knitted, knotted or looped that is the transparent or translucent yarn, and the yarn that is knitted, knotted or looped is opaque. In such a construction the transparent or translucent yarn may bulk out or provide more coverage or provide more strength, the structure of the knitted loops formed by the opaque yarn and thereby increase visibility of the netting to insects and animals.

In the illustrated embodiment, the yarns which are not knitted, knotted or looped in the connecting portions of the mesh are also not knitted, knotted or looped in the intersection of the mesh. For example, yarn 411 and yarn 415 each pass through intersection 417, making a single change in direction.

In the illustrated embodiment the yarns that are knitted, knotted or looped in the connecting portions are also knitted, knotted or looped in the intersections. For example, yarns 413 and 419 are knitted and looped together at the intersection 417.

At the intersection, the unknitted yarns 411 and 415 are retained in place by the knitting and looping of yarns 413 and 419, which pass around yarns 411 and 415.

Figure 4:
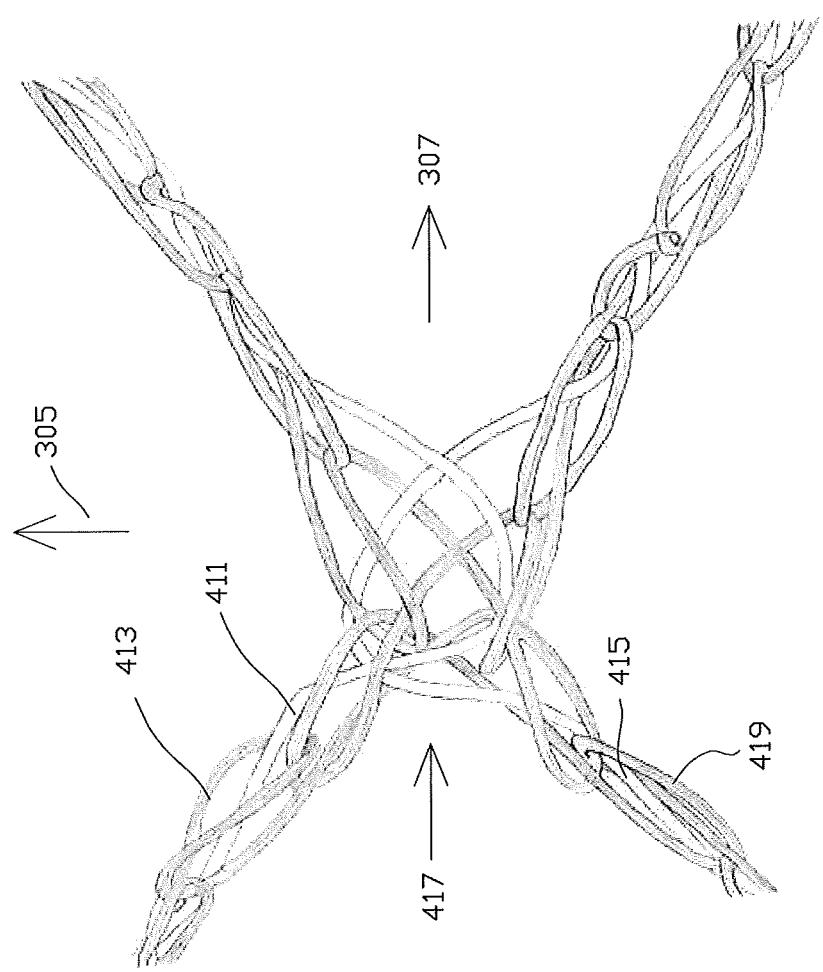
FIG. 4 is a plan view of a single intersection of netting depicted in FIG. 3.

Another exemplary intersection is illustrated in greater scale in FIG. 4, and equivalent reference numerals designate equivalent features.

Figure 5:
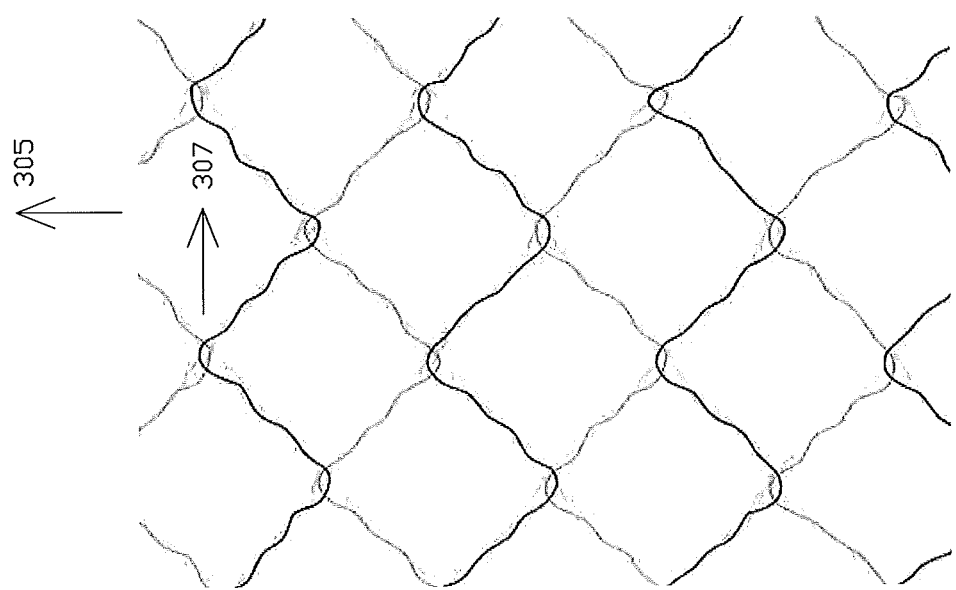
FIG. 5 is a plan view of a portion of netting as depicted in FIG. 3 with the path of certain yarns highlighted.

FIG. 5 shows a larger section of netting using the construction described with reference to FIG. 3. In this section of netting the paths of the unknitted yarns are illustrated in bold black and grey lines. The knitted yarns are deemphasised. As shown in FIGS. 3 to 5, the paths of the unknitted yarns are comparatively direct, each defining a singular zig-zag path following the connecting portions of the mesh. The zig zag paths do not include loops or knots.

Figure 6:
FIG. 6 is a photo of a portion of netting in a taut but unstretched state in accordance with an embodiment of the invention which includes a combination of white and substantially transparent yarns.

FIG. 6 illustrates one embodiment of netting having the construction described with reference to FIGS. 3 and 4. One yarn in each connecting portion is a high reflectivity, while the other yarn has a high transparency. The yarn of high reflectivity may be coloured white, for example by inclusion of white pigment in the resin. The yarn of high transparency may be substantially clear, for example lacking any pigment in the resin.

Netting of the form illustrated in FIG. 6, may have particular use as crop or plant protection netting. The high reflectivity yarn provides a visual alert for users and for wildlife. The high transmitting yarn allows maximum light penetration to the underlying plants. The path of the high reflectivity yarn is minimised in the mesh through lack of knitting, knots or loops.

In an alternative embodiment one yarn in each connecting portion is has one level of reflectivity, while the other yarn has another, different level of reflectivity (two different opaque yarns). Yarns may be coloured white for example but different white. This yarn may also have particular use as crop or plant protection netting. In one embodiment the yarn may be UV absorbing giving longevity while the other is UV reflecting, giving higher level of bird visibility and bird protection. When a yarn is UV reflecting it may reflect more than 30%, 50%, or more than 60%, or more than 70% of solar radiation, on average, across the wavelength range 280 to 400 nm. When a yarn is UV absorbing it may absorb more than 30%, 50%, or more than 60%, or more than 70% of solar radiation, on average, across the wavelength range 280 to 400 nm.

In some embodiments both yarns are UV reflecting or both are UV absorbing.

Referring particularly to FIG. 3 each shaped mesh aperture is defined substantially by four sides of substantially equal length, which are connected by four knit intersections. At the knit intersections some of the yarns of which the netting is formed are looped around each other.

In some embodiments, between the yarn intersections the connecting yarn portions may extend substantially linearly or be knitted or knotted. Preferably the translucent or different opaque/white yarns are knitted, looped, or knotted, while the reflective yarns extend substantially linearly and are not knitted, looped or knotted.

In yet further embodiments both opaque/white and transparent or translucent or different opaque/white yarns may be knitted to form the mesh construction ie each of a majority of the connecting yarn portions comprises two or more yarns including the opaque yarn and the transparent or translucent yarn or different opaque yarn. Optionally also, such a yarn may comprise another yarn which may be another transparent or translucent or opaque/white yarn knitted, looped, or knotted around the primary netting yarns knitted together.

As shown, the sides between the intersections comprise twin yarns, but may be comprised of triple or multiple yarns in alternative embodiments.

In the four-sided form of the mesh apertures, the shape of the apertures may be substantially square, rectangular or any other shape. It will also be appreciated that the mesh apertures may be knitted to have more than four sides, and with intersections in alternative forms of the knitted mesh construction to create more complex mesh aperture shapes, for example but not limited to hexagonal shaped apertures.

Figure 12:
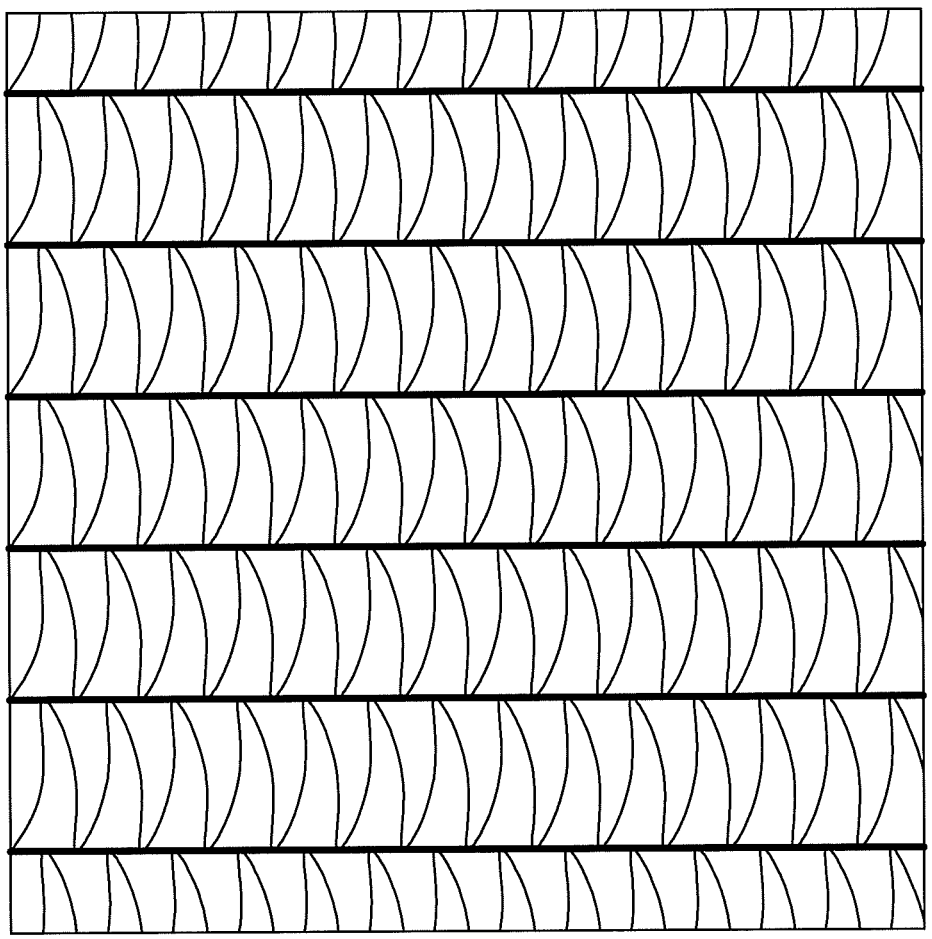
FIG. 12 is a schematic illustration of a netting having a pillar knitted construction.

Alternatively, the netting structure may be of a pillar based construction in the warp direction with crossovers. The pillars may be comprised of one type of yarn, and the crossovers comprised of a different type of yarn. FIG. 12 is an illustration of a knit having a pillar based construction in the warp direction and crossovers between the pillars.

The netting is stretchable or extendible in both the width axis or direction indicated by arrow 305 and the length axis or direction indicated by arrow 307 in FIGS. 3 and 4 which is typically the machine or manufacturing direction.

In the preferred embodiment shown the mesh size of the equi-length four sided mesh apertures is defined by the length of the sides 303 between the intersections 309, measured when the netting is in a taut but non-stretched state in both length and width directions. Preferably the length of each side may be in the range of approximately 3 mm to 20 mm.

In an alternative embodiment the netting may be as described in our international patent application PCT/NZ2011/000180 published as WO2012/030237 the entire content of which is incorporated herein by reference, with the modifications that of the three yarns from which the netting is knitted as described:
  at least one of the yarns from which the netting is knitted is a opaque yarn as described above and at least one other yarn is a transparent or translucent yarn, and/or
  at least one of the yarns from which the netting is knitted is a opaque yarn as described above and at least one other yarn is a different opaque yarn as described above.

In some embodiments the yarn from which the netting is knitted is typically a monofilament yarn of any suitable material as previously mentioned. Typically, the yarn is extruded from a polymer resin. Each yarn yarns may be single monofilaments, or alternatively may comprise twin or multiple monofilaments. The monofilament yarns may be circular in cross-section or otherwise shaped. For circular monofilament yarns, the yarn preferably has a diameter in the range of approximately 0.1 mm to 1 mm, even more preferably 0.2 mm to 0.8 mm, and even more preferably 0.2 mm to 0.4 mm, and more preferably 0.15 to 0.3 mm and most preferably 0.15 mm to 0.25 mm. In denier (grams per 9000 metres of the yarn) the yarn is preferably in the range of approximately 50 to 1000 denier, more preferably 50 to 700 denier, even more preferably 100 to 500 denier, even more preferably 100 to 300 denier, even more preferably 150 to 250 denier or most preferably 200 to 300 denier. The monofilament yarn may be stretchable or non-stretchable in length, and may be elastic or non-elastic depending on requirements. The netting is relatively lightweight. The weight of the netting is preferably in the range of approximately 10 to 100 grams per $m^2$, more preferably 15 to 80 grams per $m^2$, even more preferably 20 to 60 grams per $m^2$, even more preferably 20 to 40 grams per $m^2$, even more preferably 30 to 40 grams per $m^2$ and even more preferably 25 to 35 grams per $m^2$ and most more preferably 30 to 40 grams per $m^2$ The crop protection netting may have a cover factor (as herein defined) of less than 30%, less than 20%, less than 10%, or less than 5%.

As described, netting of the invention includes at least one reflective yarn. The reflective yarn may be of a polymer containing pigments which give the material desired properties, such as desired light reflective properties for example. In some embodiments, the yarn may be reflective as previously described, for example by using yarns having a white pigment. This reflection may provide various benefits to the trees or plants being covered, but also enhances the visibility of the netting to insects or birds. This may increase the effectiveness of the netting as insect deterrent or reduce bird entanglement or both. For example, the reflective yarn may reflect at least 10% or at least 50% of solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm. In some embodiments the yarn may reflect more solar radiation than it transmits and absorbs in the UV, visible, and very near infrared ranges. In some embodiments the yarn absorbs more solar radiation than it reflects or transmits in the UV range, and reflects more solar radiation than it transmits and absorbs in the visible, and very near infrared ranges. In some embodiments the yarn may transmit at least 15% or at least 20% of solar radiation on average in the wavelength range about 800-2500 nm. In some embodiments the yarn may reflect at least 10% on average of solar radiation across the wavelength range about 800-2500 nm. In some embodiments the yarn may be knitted from yarn from a resin comprising at least 1% or at least 2% or at least 3% or at least 4% or at least 5% or at least 8% or at least 10% or at least 12% or at least 14% or at least 16% or at least 18% or at least 20% or at least 25% by weight of at least one white pigment. In some embodiments white pigment comprises a zirconium, strontium, barium, magnesium, zinc, calcium, titanium, or potassium pigment or a combination thereof, such as zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, potassium oxide, potassium titanate, zinc oxide, zinc oxide nano particle size, barium titanate, magnesium titanate, strontium titanate, neodymium titanate, tin oxide, cerium oxide, titanium oxide, zinc sulphate or a combination thereof. The white pigment may be present in the form of particles of size 0.02-5 microns or 0.1-3 microns.

As referred to previously in some embodiments the material may also incorporate a compound or compounds added to increase the extent to which the material reflects and/or absorbs radiation from the earth when the material is placed over or adjacent to plants.

As referred to previously in some embodiments the material may also incorporate a compound or compounds added to increase the extent to which the material transmits and/or absorbs radiation from the earth when the material is placed over or adjacent to plants.

As referred to previously in some embodiments the material may also incorporate a compound or compounds added to increase the extent to which the material reflects and/or absorbs solar radiation when the material is placed over or adjacent to plants.

As referred to previously in some embodiments the material may also incorporate a compound or compounds added to increase the extent to which the material transmits and/or absorbs solar radiation when the material is placed over or adjacent to plants.

As crop protection netting, the netting of the invention is particularly suitable covering trees or other plants for insect and bird exclusion or as a wind or shade net. The netting is stretchable so that as trees or plants covered by the netting grow the netting can stretch to accommodate growth. The netting has a high degree of transparency despite having a robust construct with multiple yarns forming each side of each mesh opening, and high visibility of the netting structure due to the included reflective yarn.

Netting with Secondary Yarns Forming Secondary Apertures

Other embodiments of netting material of the invention, which are typically also used as described above with reference to FIGS. 1 and 2, comprise a plurality of primary yarns knitted to form a mesh construction having an arrangement of primary apertures defined by yarn intersections and yarn connecting portions between yarn intersections, and a plurality of secondary yarns, the secondary yarns crossing over the primary apertures to form secondary apertures within the primary apertures. Again the netting is knitted from a synthetic yarn, preferably a monofilament. In some embodiments, the netting is knitted from yarns, preferably monofilaments, formed from a resin comprising at least one pigment and yarns, preferably monofilaments, formed from a resin which is transparent or translucent.

In some embodiments netting of the invention may comprise apertures through the material of widest dimension about 40 mm. In other embodiments netting of the invention may comprise apertures through the material of widest dimension about 20 mm. In some embodiments netting of the invention may comprise apertures through the material of widest dimension in the range 10-40 mm.

A yarn from which the netting is formed may have high transmittance (being translucent or transparent), and transmit at least 30 or 40% more preferably at least 50% or 60% or 70% or more of at least UV and visible light.

Figure 7A:
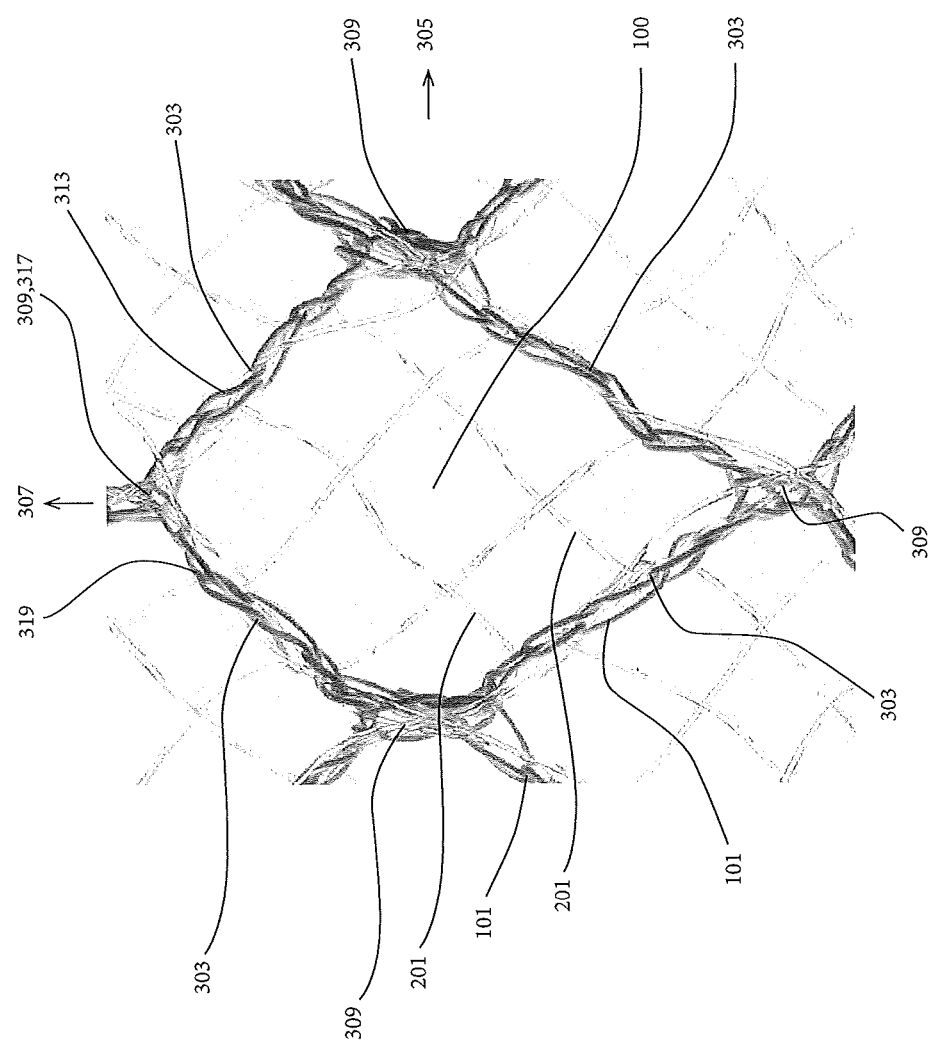
FIG. 7A is a plan view of a portion of netting in a taut but unstretched state in accordance with an embodiment of the invention.
Figure 7B:
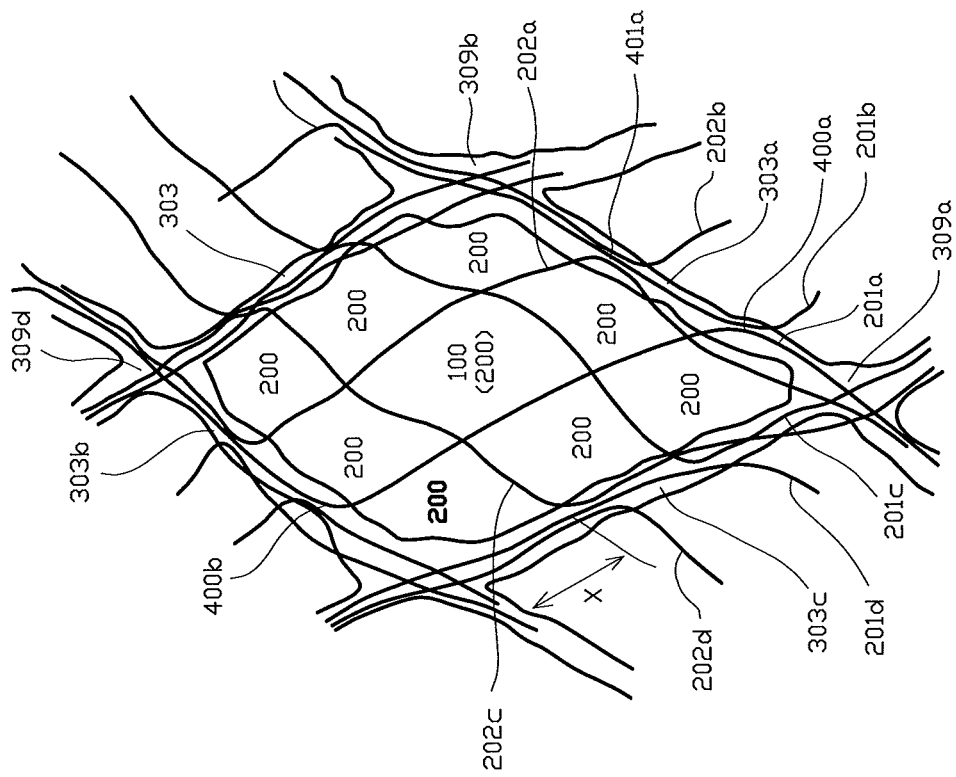
FIG. 7B is a plan view of a portion of netting in a taut but unstretched state in accordance with an embodiment of the invention, with primary yarns of the netting shown in outline.

Again, the netting is typically machine-knitted on a warp knitting machine or other knitting-machine. The netting comprises an array of mesh apertures. The mesh apertures of a netting material according to one embodiment are shaped as seen in FIGS. 7A and 7B, comprising four sides or yarn connecting portions and four yarn intersection points and are substantially uniform in shape and size. The orientation of the mesh apertures relative to the length direction 307 and width direction 305 of the netting need not be as shown in FIG. 7A. FIGS. 7A and 7B would typically be replicated throughout the major expanse of the netting. The netting may be finished with a different structure at each lateral edge, for example to include a finished edge, reinforced openings or other features.

With reference to FIG. 7A, the mesh aperture 100 is defined by yarn connecting portions 303. In the illustrated form four yarn connecting portions are arranged to form sides of a four sided aperture, which is aligned at generally 45 degrees to the length direction 307 and width direction 305 of the netting. In some embodiments the aperture may be a square or a diamond shape. The connecting portions 303 meet at yarn intersections 309.

In a netting material according to some embodiments of the present invention, the netting material comprises primary yarns 101 and secondary yarns 201. In some embodiments, each yarn 101, 201 in the netting generally proceeds in the length direction 307. The primary yarns are knitted together to form a mesh construction comprising primary apertures 100. In some embodiments, the primary yarns extend lengthwise, adjacent primary yarns being knitted or knotted or looped together at the yarn intersections 309. The primary yarns 101 extend along an alternating sequence of connecting portions 303 and intersections 309.

The primary yarns follow a path that is knitted, knotted or looped along each yarn connecting portion 303 defining the primary aperture. In the illustrated embodiment, two adjacent primary yarns are knitted, knotted or looped together at each intersection point 309. In some embodiments the netting material comprises a plurality of primary yarns each extending along a length of the netting in an approximate zig-zag path with alternating yarn intersections and connecting yarn portions, with adjacent primary yarns knitted, knotted or looped together at the yarn intersections. For example, yarns 313 and 319 are knitted and looped together at the intersection 317. The netting comprises rows of yarn intersections 309, said rows extending across either the width of the material or along the length of netting material, the yarn intersections of each row of yarn intersections 309 being staggered or offset with respect to its adjacent row of yarn intersections. Put another way, the netting comprises rows of apertures extending across either the width of the material or along the length of netting material, the apertures or each row offset compared to its adjacent row (for example, the rows may be offset as may be formed in a diamond or hexagonal knit pattern, rather than stacked as they may be in a square net pattern).

In a netting material according to some embodiments of the present invention, each secondary yarn is not knotted or looped in the yarn connecting portion. The primary yarn 101 is knitted, knotted or looped around the secondary yarn 201 in the yarn connecting portion. In other words, a secondary yarn 201 weaves back and forth or is threaded through knitted primary yarn 101 along the yarn connecting portion 303. Secondary yarn 201 is not knitted, knotted or looped, but is retained by the knitting and looping of primary yarn 101, which passes around secondary yarn 201. The secondary yarn 201 is retained by the knitting or knotting or looping of the primary yarn without being knitted, knotted or looped in the yarn connecting portion 303.

Each secondary yarn passes part way along a yarn connecting portion 303 and then extends from the yarn connecting portion 303 to cross over a primary aperture 100 to another yarn connecting portion defining that primary aperture 100. That is, the secondary yarn extends across the primary aperture 100 between a pair of yarn connecting portions. As at least one secondary yarn crosses between each pair of yarn connecting portions of an aperture 100, at least two secondary yarns cross over each primary aperture 100 thus defining at least four smaller secondary apertures within each primary aperture.

Figure 8:
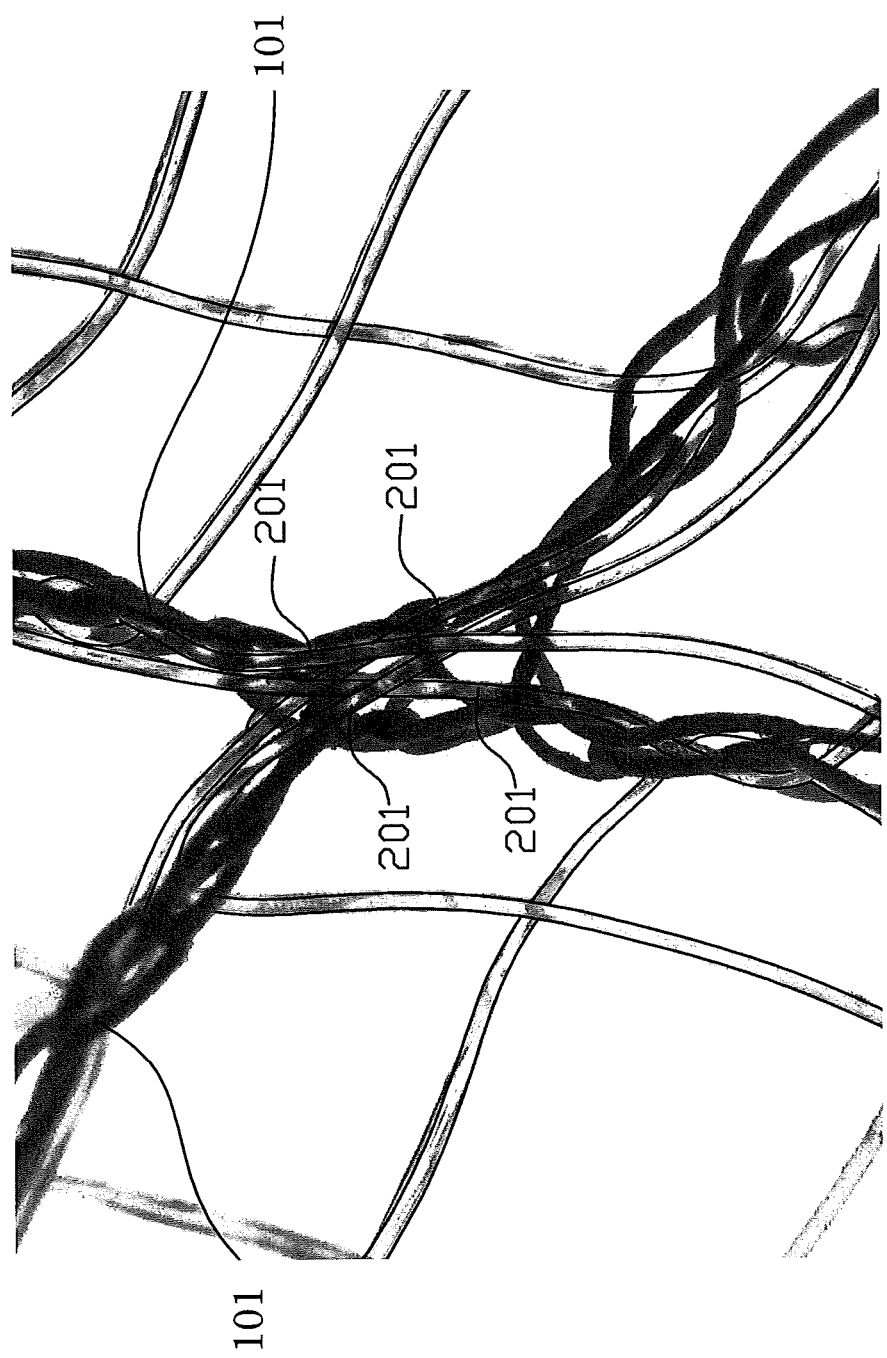
FIG. 8 is a plan view of a single intersection of netting depicted in FIGS. 7A and 7B.
Figure 9A:
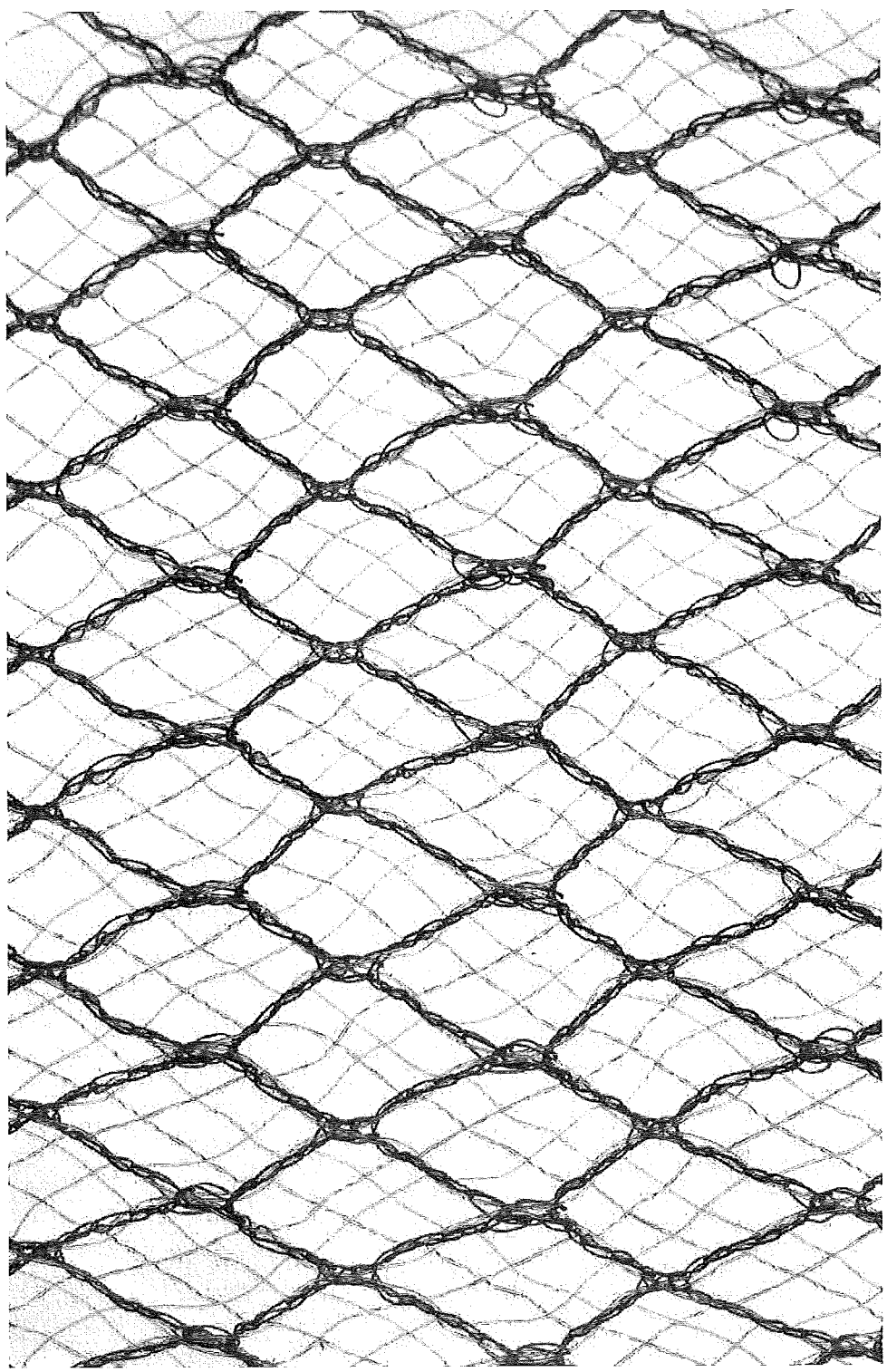
FIG. 9A is a plan view of a larger portion of netting as depicted in FIGS. 7A and 7B.
Figure 9B:
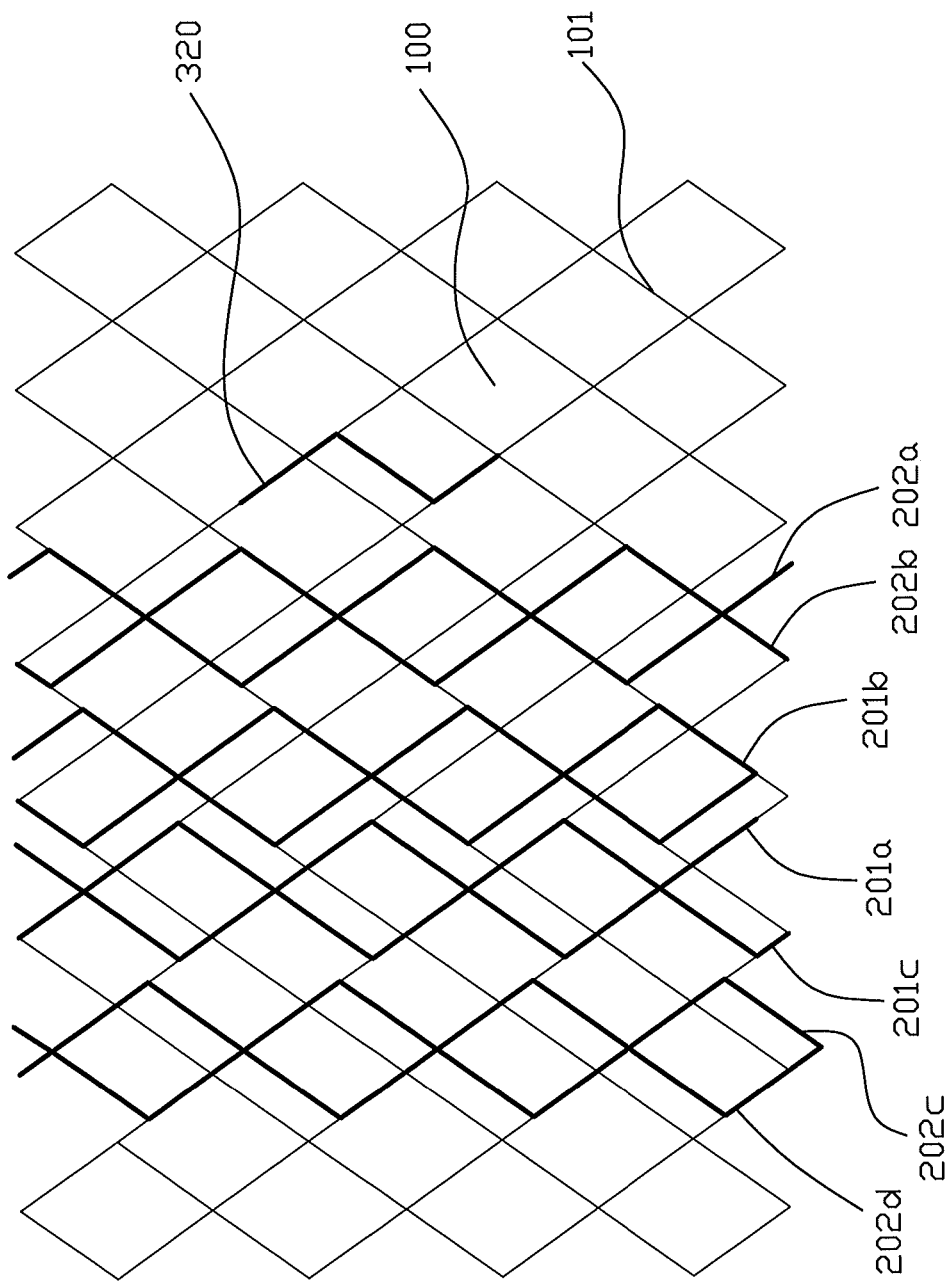
FIG. 9B is a plan view of a larger portion of netting as depicted in FIGS. 7A and 7B with primary yarns of the netting shown in outline and with the path of certain secondary yarns of the netting indicated.

In some embodiments the netting material comprises a plurality of secondary yarns each of which extends along a length of the netting material in an approximate zig-zag path. For example, each secondary yarn extends along the length of the netting material in an approximate zig-zag path and has a zig-zag pitch and amplitude the same as a zig-zag pitch and amplitude of the primary yarns. The zig-zag path of each secondary yarn is offset along a connecting yarn portion of the mesh construction by a distance, for example distance "x" illustrated in FIG. 7B. Thus each secondary yarn extending in a zig-zag pattern has a repeating portion (for example portion 320 indicated in FIG. 9B) that extends from an intersection point 309, partway along a yarn connecting portion 303, across a primary aperture 100 to the yarn connection portion 303 on the opposite side of the aperture, and then partway along the yarn connecting portion 303 on the opposite side of the primary aperture to the next yarn intersection 309 along the netting material. In some embodiments the secondary yarn is not knotted or looped in the yarn intersections of the netting material. Thus the secondary yarns extend along the netting material in a zig-zag path along yarn connecting portions and through or over yarn intersections and across primary apertures without being knitted, knotted or looped in the netting and is retained by the knitted, knotted or looped primary yarns in the yarn connecting portions and/or intersections of the netting. For example, each secondary yarn passes through or over a yarn intersection point 309 without a substantial change in direction. An exemplary intersection 309 is illustrated in greater detail in FIG. 8.

In some embodiments the secondary yarns may cross over primary apertures without passing along a yarn connection portion. For example each secondary yarn may pass orthogonally through a yarn connecting portion without passing along the yarn connecting portion.

As illustrated in FIG. 7B where the knitted primary yarns are shown in outline to aid with clarity in the path of the secondary yarns, in some embodiments, a secondary yarn, for example 201a, extends part way along a yarn connecting portion 303a from a yarn intersection 309a at a first end of the yarn connecting portion to a separation point 400a. The yarn diverges from or extends from the separation point 400a to pass across the primary aperture 100. An adjacent secondary yarn 201b enters the same yarn connecting portion 303a at or near to the separation point 400a and extends along the remainder of the yarn connecting portion 303a from the separation point 400a to the yarn intersection 309b at the second end of the yarn connecting portion. The secondary yarn 201a enters the yarn connecting portion 303b at the opposite side of the primary aperture 100 and extends along that yarn connecting portion from a separation point 400b to the yarn intersection 309d at the second end of the yarn connecting portion 303b. The adjacent secondary yarn 201b passes through or over the yarn intersection 309b at the second end of the yarn connecting portion 303a and into the yarn connecting portion of an adjacent aperture.

Thus each yarn connecting portion comprises at least two adjacent secondary yarns, by example 201a and 201b. The adjacent secondary yarns for example 201a, 201b are illustrated in FIG. 7B to not overlap to add clarity in illustrating the paths of the secondary yarns in the netting material. However, in some embodiments the adjacent secondary yarns 201a, 201b may overlap at the separation point 400a. Preferably the adjacent secondary yarns 201a and 201b are not looped or intertwined together at the separation point 400a.

Figure 10:
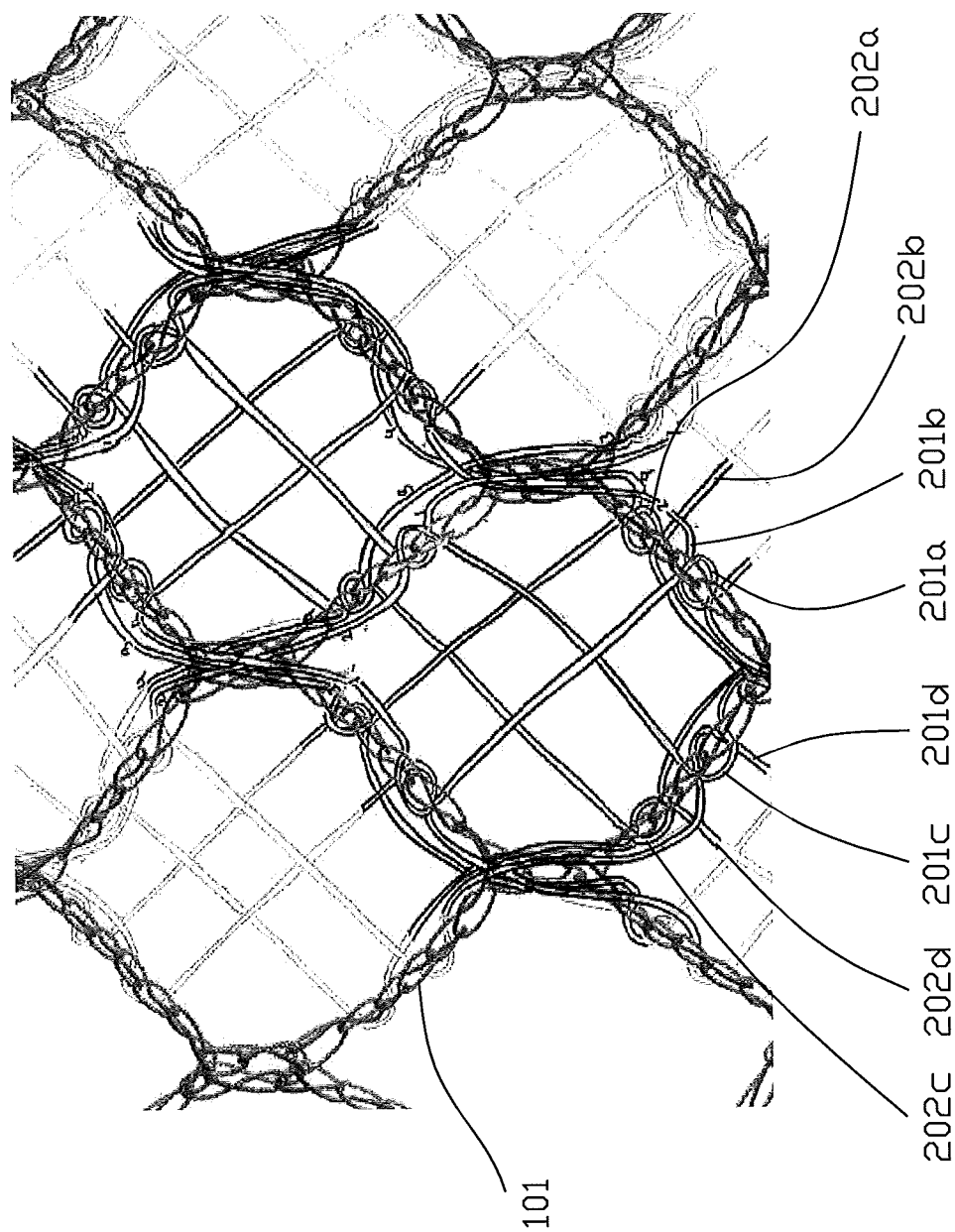
FIG. 10 is a plan view of a portion of netting as depicted in FIGS. 7A and 7B but with bending or curvature of secondary yarns in the netting exaggerated for ease of displaying the path of the secondary yarns through the netting material.

An adjacent yarn connecting portion 303c defining the aperture 100 and extending orthogonally (at an angle) to yarn connecting portion 303a similarly includes two adjacent secondary yarns 201c and 201d. Thus at least two secondary yarns 201a and 201c cross over the aperture 100 to define at least four secondary apertures within the primary aperture. That is, each yarn connecting portion 303 has a secondary yarn which is not knotted or looped in the yarn connecting portion that extends part way along the yarn connecting portion and extends from the yarn connecting portion to cross over a primary aperture to another yarn connecting portion defining the primary aperture so that at least two secondary yarns 201a, 201c cross over each primary aperture 100 to define at least four secondary apertures in each primary aperture. The zig-zag path of each secondary yarn is offset along a connecting yarn portion of the mesh construction by a distance equal to a size of a secondary aperture. In the illustrated embodiment there are four pairs of adjacent secondary yarns that extend partially along the yarn connection portions of a primary aperture 100; for example secondary yarns 201a and 201b, 201c and 201d, 202a and 202b, and 202c and 202d, as illustrated in FIG. 7B. These eight secondary yarns that are shown with reference to a single primary aperture in FIG. 7B are shown spaced apart in FIG. 9B to illustrate the zig-zag path of the secondary yarns through the netting material. FIG. 10 provides a further illustration of a netting material according to some embodiments of the present invention with four pairs of secondary yarns 201a and 201b, 201c and 201d, 202a and 202b, and 202c and 202d shown threaded through the knitted primary yarns 101. In FIG. 10, the bending or curve of the secondary yarns as they change direction through the knit of the primary yarns is exaggerated for ease of displaying the path of the secondary yarns.

In the illustrated embodiment, each of a majority of the connecting yarn portions 303 comprises one pair of secondary yarns, for example secondary yarns 201a and 202a in yarn connecting portion 303a and secondary yarns 201c and 202c in yarn connecting portion 303c. In each yarn connecting portion the pair of secondary yarns pass part way along the connecting yarn portion and extend from the connecting yarn portion to cross over the primary aperture 100 in a spaced apart relation to a connecting yarn portion on an opposite side of the primary aperture. Therefore, two pairs of secondary yarns 201a, 202a and 201c, 202c cross over each primary aperture 100 to define nine secondary apertures 200 in each primary aperture 100.

In some embodiments, each of a majority of connecting yarn portions 303 comprise more than two secondary yarns each of which extend partway along the yarn connecting portion and extend across the primary aperture in a spaced apart relation. For example, in one embodiment each connecting yarn portion may comprise three secondary yarns 200 extending partway along the connecting yarn portion 303 and across a primary aperture 100 in a spaced apart relation to the connecting yarn portion on the opposite side of the primary aperture so that the crossing secondary yarns extending from adjacent connecting yarn portions (e.g. connecting yarn portions 303a and 303c) define sixteen secondary apertures within the primary aperture.

In some embodiments the secondary apertures 200 and the primary apertures 100 have the same or similar aspect ratio. For example, in an embodiment where a single secondary yarn extends from each yarn connection portion 303 across the aperture, the yarn separation point 400a is located midway between the yarn intersection points 309 so that the secondary apertures are equal size, each secondary aperture having an area of ¼ of the area of a primary aperture. In some embodiments, a pair of secondary yarns extends from each yarn connecting portion across the primary aperture, a first one of the pair of secondary yarns extending from a separation point 400a positioned one third along the length of the yarn connecting portion 303 and a second one of the pair of secondary yarns extending from a separation point 401a positioned two thirds along the length of the yarn connecting portion, so that the two pairs of secondary yarns crossing the primary aperture define nine equal sized secondary apertures each having an area of ⅑$^{th}$ of the area of the primary aperture. In practice, due to movement of the yarns within the netting and the yarns not being tightly retained or knotted in the netting between intersections and separation points the sizes of the secondary apertures and primary apertures vary such that the apertures are not necessarily equal size even when the netting is manufactured to a netting pattern comprising equal sized secondary apertures and equal sized primary apertures. Thus, it is to be understood that in this specification and claims, when it is stated that apertures are of an equal size or have the same aspect ratio or of a general shape, such statements refer to a nominal netting pattern rather than a specific netting example where the apertures size and shape may be pulled out of nominal size and/or shape.

In some embodiments of netting having the construction described with reference to FIGS. 7A to 9B, the netting includes yarns of contrasting reflectivity. In some embodiments the primary knitted yarns have a high reflectivity, while the secondary unknitted yarns have a high transparency. The yarn of high reflectivity may be coloured white, for example by inclusion of white pigment in the resin. For example, the primary yarn may comprise a white pigment, for example titanium dioxide or calcium carbonate or a combination of both. The yarn of high transparency may be substantially clear, for example lacking any pigment or having only a small amount eg about 1% or less of pigment in the resin. In some embodiments the secondary yarns are of a contrasting colour to the colour of the primary yarns. In some embodiments the secondary yarns may be clear, white, black or other colour to impart different properties. In some embodiments the primary and secondary yarns are the same type of yarn. For example, a netting material as illustrated in FIGS. 7A to 10 may comprise white pigmented primary and secondary yarns. In some embodiments the secondary yarn may have only a small amount eg about 1% pigment. Such a netting material will provide higher shading than a netting material comprising white pigmented primary yarns and clear secondary yarns. Providing the secondary yarns in the netting material in the way described above allows a smaller aperture size in a netting material without the requirement to knit the secondary yarns into the netting; the secondary yarns are held in place in the netting material by the primary yarns being knitted around the secondary yarns. The amount of shading provided by the netting is reduced compared to a completely knitted netting having apertures the same size as the secondary apertures of a netting material according to the present invention. This is because the secondary yarns of a netting material according some embodiments of the present invention are not knitted. The knitted primary yarns provide strength or structure to the netting material and the secondary yarns cross over the primary apertures to provide smaller secondary apertures within the primary apertures.

Netting of the form illustrated in FIGS. 7A to 9B and comprising primary yarns having a high reflectivity and secondary yarns having a high transparency may have particular use as crop or plant protection netting. The high reflectivity yarn provides a visual alert for users and for wildlife, for example birds. Thus the netting may be suitable for use as bird netting for example. However, the high transmitting secondary yarns allows maximum light penetration to the underlying plants, through the primary apertures 100 of the netting material. The smaller size of the secondary apertures 200 formed by transparent yarns within the primary apertures provides additional protection that protection afforded by the primary yarns. For example, hail stones smaller than the size of the primary apertures but larger than the size of the secondary apertures are impeded from penetrating the netting by the transparent yarns. However, the transparent yarns help to provide maximum light penetration via the primary apertures. In the four-sided form of the primary apertures, the shape of the apertures may be substantially square, rectangular or any other shape. It will also be appreciated that the primary apertures may be knitted to have more than four sides, and with intersections in alternative forms of the knitted mesh construction to create more complex mesh aperture shapes, for example but not limited to hexagonal shaped apertures.

The netting is stretchable or extendible in both the width axis or direction indicated by arrow 305 and the length axis or direction indicated by arrow 307 in FIG. 7A which is typically the machine or manufacturing direction.

In the illustrated embodiment the mesh size of the equi-length four sided mesh apertures is defined by the length of the sides 303 between the intersections 309, measured when the netting is in a taut but non-stretched state in both length and width directions.

Preferably the length of each side may be in the range of approximately 3 mm to 30 mm or 20 mm.

The primary and secondary yarns are typically monofilament yarns of any suitable material as previously mentioned. Typically, the yarns are extruded from a polymer resin. Each yarn may be single monofilaments, or alternatively may comprise twin or multiple monofilaments. The monofilament yarns may be circular in cross-section or otherwise shaped. For circular monofilament yarns, the yarn preferably has a diameter in the range of approximately 0.1 mm to 1 mm, even more preferably 0.2 mm to 0.8 mm, and even more preferably 0.2 mm to 0.4 mm, and more preferably 0.15 to 0.3 mm and most preferably 0.15 mm to 0.25 mm. In denier (grams per 9000 metres of the yarn) the yarn is preferably in the range of approximately 50 to 1000 denier, more preferably 50 to 700 denier, even more preferably 100 to 500 denier, even more preferably 100 to 300 denier, even more preferably 150 to 250 denier or most preferably 200 to 300 denier. The monofilament yarn may be stretchable or non-stretchable in length, and may be elastic or non-elastic depending on requirements.

The netting is relatively lightweight. The weight of the netting is in the range of approximately 20 to 200 grams per $m^2$, or 25 to 150 grams per $m^2$, or 30 to 100 grams per $m^2$, or 40 to 80 grams per $m^2$.

The crop protection netting may have a cover factor (as herein defined) of less than 35%, less than 30%, less than 20%, less than 10%, or less than 5%.

As described, netting of the invention may include at least one reflective yarn. The reflective yarn may be of a polymer containing pigments which give the material desired properties, such as desired light reflective properties for example. In some embodiments, the yarn may be reflective as previously described, for example by using yarns having a white pigment. This reflection may provide various benefits to the trees or plants being covered, but also enhances the visibility of the netting to insects or birds. This may increase the effectiveness of the netting as insect deterrent or reduce bird entanglement or both. For example, the reflective yarn may reflect at least 10% or at least 50% of solar radiation on average across the UV (wavelength about 280-400 nm), visible (wavelength about 400-700 nm) and very near infrared (wavelength about 700-800 nm) ranges, and which transmits at least 10% on average of solar radiation across the wavelength range about 800-2500 nm. In some embodiments the yarn may reflect more solar radiation than it transmits and absorbs in the UV, visible, and very near infrared ranges. In some embodiments the yarn may transmit at least 15% or at least 20% of solar radiation on average in the wavelength range about 800-2500 nm. In some embodiments the yarn may absorb at least 60% solar radiation on average across the UV (wavelength about 280-400 nm), and reflects at least 50% solar radiation across the visible (wavelength about 400-700 nm) and very near infrared (wavelength about 700-800 nm) ranges. In some embodiments the yarn may reflect at least 10% on average of solar radiation across the wavelength range about 800-2500 nm. In some embodiments the yarn may be knitted from yarn from a resin comprising at least 1% or at least 2% or at least 3% or at least 4% or at least 8% or at least 10% or at least 12% or at least 14% or at least 16% or at least 18% or at least 20% or at least 25% by weight of at least one white pigment. In some embodiments white pigment comprises a zirconium, strontium, barium, magnesium, zinc, calcium, titanium, or potassium pigment or a combination thereof, such as zirconium dioxide, magnesium zirconate, calcium zirconate, strontium zirconate, barium zirconate, zirconium silicate, zinc sulphide, calcium carbonate, barium sulphate, magnesium oxide, strontium carbonate, barium carbonate, titanium dioxide, potassium oxide, potassium titanate, zinc oxide, zinc oxide nano particle size, barium titanate, magnesium titanate, strontium titanate, neodymium titanate, tin oxide, cerium oxide, titanium oxide, zinc sulphate or a combination thereof. The white pigment may be present in the form of particles of size 0.02-5 microns or 0.1-3 microns.

As referred to previously in some embodiments the material may also incorporate a compound or compounds added to increase the extent to which the material reflects and/or absorbs radiation from the earth when the material is placed over or adjacent to plants.

As referred to previously in some embodiments the material may also incorporate a compound or compounds added to increase the extent to which the material transmits and/or absorbs radiation from the earth when the material is placed over or adjacent to plants.

As referred to previously in some embodiments the material may also incorporate a compound or compounds added to increase the extent to which the material reflects and/or absorbs solar radiation when the material is placed over or adjacent to plants.

As referred to previously in some embodiments the material may also incorporate a compound or compounds added to increase the extent to which the material transmits and/or absorbs solar radiation when the material is placed over or adjacent to plants.

As crop protection netting, the netting of the invention may be suitable covering trees or other plants for insect and/or bird exclusion. In addition to be suitable for insect or bird netting, the netting is particularly suitable for protection against hail or insects of a smaller size than the size of the primary apertures, while maintaining transparency through the netting. In some embodiments the netting is particularly useful as hail or wind protection netting due to the size of the secondary apertures, while providing a reduced shading effect due to the secondary yarns being clear and the primary yarns being opaque, compared to a netting material knitted from opaque yarns with apertures of a similar size to the size of the secondary apertures.

Figure 11:
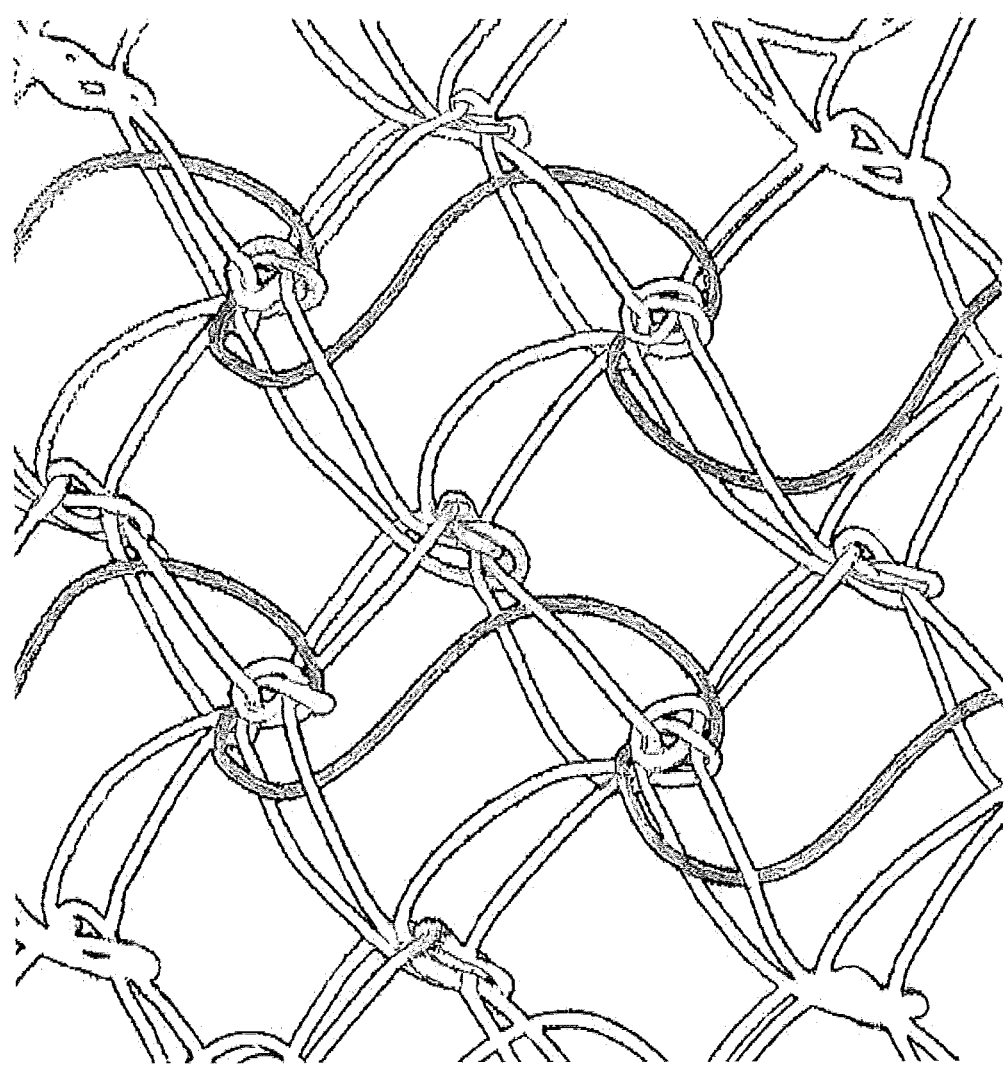
FIG. 11 is a plan view of a portion of netting in a taut but unstretched state in accordance with an alternative embodiment of the invention

FIG. 11 is a plan view of a portion of netting in a taut but unstretched state in accordance with an alternative embodiment of the invention. In the illustration the lay-in is shown in darker shading.

The following is a description of the spectrophotometer system and measuring method used for measuring solar radiation transmittance and reflectance values across the range 220 to 2500 nm quoted in the specification unless otherwise stated.

In this specification, diffuse transmittance and diffuse reflectance data is measured of filaments or tapes themselves of the netting or ground cover material. For filaments, filaments are aligned side by side with no (or minimal) gaps between them to create a surface area large enough for a monochromatic beam to focus upon. The method of measurement is described below. Diffuse reflectance and diffuse transmittance of a region of netting or ground cover material as a whole can be calculated by determining the proportion of area covered by the tapes or filaments versus that not covered by tapes or filaments.

The spectrophotometer system is based around a GSA/McPherson 2051 1 metre focal length monochromator fitted with a prism predisperser and also stray light filters. The light source is a current regulated tungsten halogen lamp. The bandwidth is adjustable up to 3 nm. The monochromatic beam from the monochromator is focused onto the sample or into the integrating sphere using off-axis parabolic mirrors. The integrating spheres are coated with pressed halon powder (PTFE powder). Halon powder is also used as a white reflectance reference material. The detector is usually a silicon photodiode connected to an electrometer amplifier and digital volt meter. The whole system is controlled using software written in LabVIEW. The detectors used can be photomultiplier tubes, silicon diodes or lead sulphide detectors.

Diffuse Reflectance

Diffuse reflectance is measured using an integrating sphere with an internal diameter of 75 mm with the sample tilted at an angle of 6° to the incident light (specular reflectance included). The reference sample is pressed halon powder and a black cone is used to correct for stray light. Up to four test samples are mounted on a pneumatic driven sample changer along with the white reference and black cone.

Diffuse Transmittance

Diffuse transmittance is measured using an integrating sphere with an internal diameter of 120 mm and coated with pressed halon powder. The sample is mounted on one port and the incident light port is at an angle of 90° around the sphere. The sphere rotates by 90° in the horizontal plane to allow the focused incident light to enter the sphere through the incident light port or the incident light to be transmitted through the sample and enter the sphere. The detector is mounted at the top of the sphere.

Absorbance

Absorbance is calculated as a back calculation from the calculated transmittance and reflectance values.

This description also incorporates herein by reference all subject matter disclosed in the claims appended hereto.

The foregoing describes the invention including preferred forms thereof. Alterations and modifications as will be obvious to those skilled in the art are intended to be incorporated in the scope hereof as defined in the accompanying claims.

The invention claimed is:

1. A netting material having a cover factor of less than 90%, which is formed from at least two synthetic material yarns of which one or more is opaque and another or more is a transparent or translucent yarn, and wherein a first one of said at least two synthetic material yarns is knitted to form a knitted mesh construction having an arrangement of primary apertures defined by yarn intersections and yarn connecting portions between yarn intersections, and a second one of said at least two synthetic material yarns forms a removable lay-in that is in addition to the knitted mesh construction and is supported solely by the knitted mesh construction in a manner that provides for inserting into and removing from the knitted mesh construction, and the knitted mesh construction remains intact regardless of the presence or lack thereof of the removable lay-in.

2. The netting according to claim 1 wherein the opaque yarn transmits, on average, 2% to 50% less, of solar radiation across the 400-700 nm wavelength range compared to the translucent or transparent yarn.

3. The netting according to claim 1 wherein the opaque yarn comprises at least one pigment which is white.

4. The netting according to claim 1 wherein the first one of the at least two synthetic material yarns is UV absorbing and the second one of the at least two synthetic material yarns is UV reflecting.

5. The netting according to claim 1 wherein the transparent or translucent yarn comprises at least one pigment which is white.

6. The netting according to claim 1 wherein the first one of the at least two synthetic material yarns is UV reflecting and the second one of the at least two synthetic material yarns is UV absorbing.

7. The netting according to claim 1 wherein both of said at least two synthetic material yarns are UV reflecting.

8. The netting according to claim 1 wherein both of said at least two synthetic material yarns are UV absorbing.

9. The netting material according to claim 1 which is knitted from the opaque yarn and at least one other yarn to form a mesh construction with an arrangement of apertures defined by yarn intersections and connecting yarn portions between the yarn intersections; wherein each of a majority of the connecting yarn portions comprises the opaque yarn and said at least one other yarn; wherein the opaque yarn is not knitted, knotted or looped in the connecting yarn portion; and wherein the transparent or translucent yarn is in the connecting yarn portion knitted, knotted or looped around the opaque yarn.

10. The netting according to claim 1 wherein the opaque yarn is the lay-in.

11. The netting according to claim 1 wherein the transparent or translucent yarn is the lay-in.

12. The method of treating a plant or fruit or vegetables thereon which comprises providing over and/or adjacent the plant as bird netting, insect netting, shadecloth netting, windbreak netting, or hail protection netting a netting material according to claim 1.

13. A netting material having a cover factor of less than 90%, comprising:
a plurality of primary yarns knitted to form a knitted mesh construction having an arrangement of primary apertures defined by yarn intersections and yarn connecting portions between yarn intersections, and
a plurality of secondary yarns, the secondary yarns being in addition to said knitted mesh construction and supported solely by the knitted mesh construction, such that if the secondary yarns are removed the knitted mesh construction will remain intact, the secondary yarns crossing over the primary apertures to form secondary apertures within the primary apertures, and
wherein one of the primary yarns and the secondary yarns is opaque and the other of the primary yarns and the secondary yarns is a transparent or translucent yarn.

14. The netting material according to claim 13 wherein the secondary yarns are retained in the netting material by the knitting or knotting or looping of the primary yarns without being knitted, knotted or looped in the yarn connecting portions.

15. The netting material according to claim 13 wherein the secondary yarn is not knotted or looped in the yarn intersections of the netting material.

16. The netting material according to claim 13, each of a majority of the connecting yarn portions comprising:
two or more secondary yarns, each secondary yarn not knotted or looped in the connecting yarn portion,
a primary yarn being knitted, knotted or looped around the two or more secondary yarns in the connecting yarn portion,
wherein the secondary yarns pass part way along the connecting yarn portion and extend from the connecting yarn portion to cross over a primary aperture in a spaced apart relation to another connecting yarn portion defining the primary aperture so that at least two pairs of secondary yarns cross over each primary aperture to define at least nine secondary apertures in each primary aperture.

17. The netting material according to claim 13, wherein the primary yarn and/or the secondary yarn is white and comprises a white pigment.

18. The netting material according to claim 13 wherein the primary yarn and/or the secondary yarn is translucent or transparent.

19. The netting material according to claim 13 wherein the primary yarn and secondary yarn have different reflectance, absorbance and/or transmittance characteristics.

20. The netting according to claim 13 wherein the primary yarn and/or secondary yarn absorbs at least 50% solar radiation on average across the UV range, and reflects at least 30% solar radiation across the visible and very near infrared ranges.

21. A netting material having a cover factor of less than 90%, comprising:
a plurality of primary yarns knitted to form a knitted mesh construction having an arrangement of primary apertures defined by yarn intersections and yarn connecting portions between yarn intersections, each primary yarn being an opaque yarn; and
a plurality of secondary yarns, the secondary yarns being in addition to said knitted mesh construction and only supported by the knitted mesh construction, such that if the secondary yarns are removed the knitted mesh construction will remain intact, crossing over the primary apertures to form a plurality of secondary apertures within the plurality of primary apertures, the secondary apertures being smaller than the primary apertures, each secondary yarn being a transparent or translucent yarn.

* * * * *

UNITED STATES PATENT AND TRADEMARK OFFICE
CERTIFICATE OF CORRECTION

Page 1 of 1

PATENT NO. : 10,939,624 B2
APPLICATION NO. : 15/118080
DATED : March 9, 2021
INVENTOR(S) : Jonathan Dallas Toye It is certified that error appears in the above-identified patent and that said Letters Patent is hereby corrected as shown below:

On the Title Page

Item (87) PCT Publication:
"PCT Pub. Date: Aug. 2, 2015" should read: --PCT Pub. Date: Aug. 20, 2015--.

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*